US012599148B2

(12) United States Patent
Milanese

(10) Patent No.:  US 12,599,148 B2
(45) Date of Patent:      Apr. 14, 2026

(54) SEMI-AUTOMATIC MACHINE FOR CRUSHING AND FOR COLLECTING OUTSIDE FROZEN FOOD SUBSTANCES FOR A SUBSEQUENT FOOD USE OF SAID FOOD SUBSTANCES

(71) Applicant: AD MAIORA S.R.L., Susegana (IT)

(72) Inventor: Pier Antonio Milanese, Susegana (IT)

(73) Assignee: AD MAIORA S.R.L., Susegana (IT)

( * ) Notice:  Subject to any disclaimer, the term of this patent is extended or adjusted under 35 U.S.C. 154(b) by 917 days.

(21) Appl. No.:  17/790,220

(22) PCT Filed:  Dec. 29, 2020

(86) PCT No.:  PCT/IT2020/050327

§ 371 (c)(1),
(2) Date:  Jun. 30, 2022

(87) PCT Pub. No.:  WO2021/137263

PCT Pub. Date: Jul. 8, 2021

(65) Prior Publication Data

US 2023/0081848 A1      Mar. 16, 2023

(30) Foreign Application Priority Data

Dec. 31, 2019    (IT) ........................ 102019000025852

(51) Int. Cl.
*A23G 9/28*          (2006.01)
*A47J 43/044*       (2006.01)
*A47J 43/07*        (2006.01)

(52) U.S. Cl.
CPC ............ *A23G 9/28* (2013.01); *A47J 43/0705* (2013.01); *A47J 2043/04454* (2013.01)

(58) Field of Classification Search
None
See application file for complete search history.

(56) References Cited

U.S. PATENT DOCUMENTS

2014/0061342 A1*  3/2014  Machovina ............. A47J 43/07
                                                                   241/64
2016/0066616 A1    3/2016  Yamaguchi
2018/0014554 A1*  1/2018  Kim ......................... F25C 5/12

FOREIGN PATENT DOCUMENTS

WO           8906106 A1      7/1989
WO        2015156502 A1    10/2015

OTHER PUBLICATIONS

International Search Report and Written Opinion issued on Apr. 20, 2021 in corresponding International Patent Application No. PCT/IT2020/050327; 9 pages.

* cited by examiner

*Primary Examiner* — John J Norton
(74) *Attorney, Agent, or Firm* — Maier & Maier, PLLC

(57)          ABSTRACT

Semi-automatic machine for crushing and for collecting outside frozen food substances contained in an external storage container, for a subsequent food use of the food substances, that is for being eaten, as for example fruit smoothies, slushes, ice creams, etc., and/or for preparing foods to be eaten later, as for example condiments, seasonings, which machine being of the electrical type and including a support cabinet adapted to contain and to support at least a first electrical actuation means, at least a motion transmission element, at least an upper closing and pushing unit, and at least a lower crushing and discharging unit, the storage container containing the frozen food substance being able to be placed between the closing and pushing unit and the crushing and discharging unit, in such a way the same frozen food substance may be crushed and at the same time discharged outside the same machine.

5 Claims, 26 Drawing Sheets

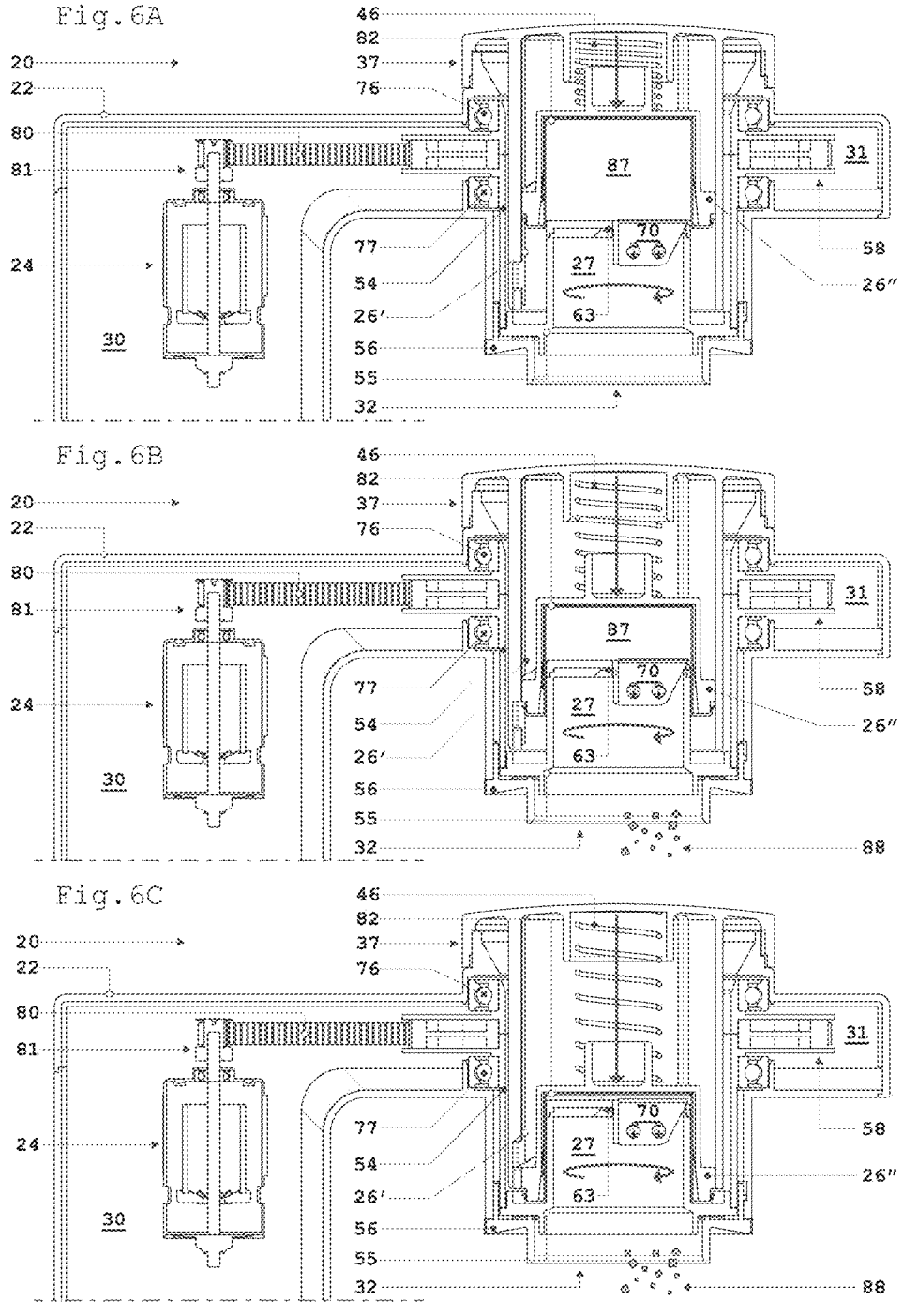

1

SEMI-AUTOMATIC MACHINE FOR CRUSHING AND FOR COLLECTING OUTSIDE FROZEN FOOD SUBSTANCES FOR A SUBSEQUENT FOOD USE OF SAID FOOD SUBSTANCES

FIELD

The present invention concerns to a semi-automatic machine for crushing and then for collecting frozen food substances outside for their subsequent food use, that is to be eaten, as for example fruit smoothies, slushes, ice creams, etc. and/or for preparing foods to be eaten later, such as condiments or seasonings.

BACKGROUND

There are known devices for blending and/or crushing frozen food substances for the preparation of fruit smoothies, slushes, ice creams, etc., constituted by a support structure comprising at least a first upper compartment, accessible through a support able to be opened and closed, in which at least one rotating blade operated by an electric motor located in a further second compartment is inserted, which motor is operated by means of controls arranged externally to the support structure.

Below the rotating blade, the first compartment has a lower through opening that connects it to a third lower open compartment, where to place a collecting container.

In order to blend or to grind frozen food with the aforementioned device, it is necessary to extract the frozen food substance, which is present in a single body, from the storage container in which it is contained and to transfer it to the first upper compartment of the device, then closing such a compartment. Then the motor that activates the rotating blade starts, which blends and crushes the frozen food, making relative flakes or fragments fall into the lower through opening and consequently into the collecting container, in order to then be able to eat them, possibly aromatize with additional syrups.

Such a type of device presents the problem to be forced to extract the frozen food substance from the storage container each time, therefore it is necessary to lose time for such an operation.

Furthermore, for the aforementioned extraction, it may be necessary to heat the storage container, thus dissolving the external part of the single body of the food substance, which could cause loss of its food properties.

Furthermore, by inserting the single body of frozen food substance in the upper compartment where the crushing, by means of a rotating blade, takes place, it is possible to cause damage to the same device, as a single frozen body moved by a blade may break the internal structure of the same compartment.

There are additional manual devices for crushing frozen foods, constituted by an elongated body, of such shape and size that it may be handled with one hand, in which elongated body there is inserted an electric motor that drives a rotating blade positioned externally near one end portion of said elongated body, and possibly protected by a circular casing. With such a manual device, it is necessary to keep the storage container of the single body frozen food substance still, preferably with one hand, and to proceed with the crushing by penetrating said manual device, held with the other hand, inside the frozen body, dropping the flakes or fragments into a suitable container.

Such an operation is made difficult since the used storage containers for the frozen food substances usually have a frusto-conical shape and a smooth outer surface, causing several problems.

A first problem, caused by the smooth outer surface of the container, is that it is difficult to keep it still during the crushing step, without that the same storage container starting to rotate.

Further problems are caused by the frusto-conical shape of the storage container, which, in case of small sizes thereof, does not allow the manual crushing device to penetrate up to the bottom of the same container, thereby creating food waste, or in the case such a container has a greater size, it is necessary to repeat the penetration with the manual crushing device several times to be able to crush all the frozen substance contained therein. Furthermore, having to use the hands to keep the storage container still and to use the manual crushing device, the risk of accidents increases and the flakes or fragments of crushed food substance may dirty the environment, without careful attention of the operator.

SUMMARY

The object of the present invention is to realize a semi-automatic machine for crushing and for collecting frozen food substances externally for their subsequent food use, which eliminates the above problems.

BRIEF DESCRIPTION OF THE FIGURES

This semi-automatic machine for crushing and for collecting frozen food substances externally is realized with the construction characteristics that will be described, by way of non-limiting example only, and with particular reference to the attached claims, and to the attached figures:

FIGS. 6*a*, 6*b*, and 6*c*, which show respectively with a side section view of a group of component elements of the machine of FIG. 1, in a first, second and third step of the crushing cycle of the frozen food substance;

DETAILED DESCRIPTION OF THE EMBODIMENTS

Figure 1A:
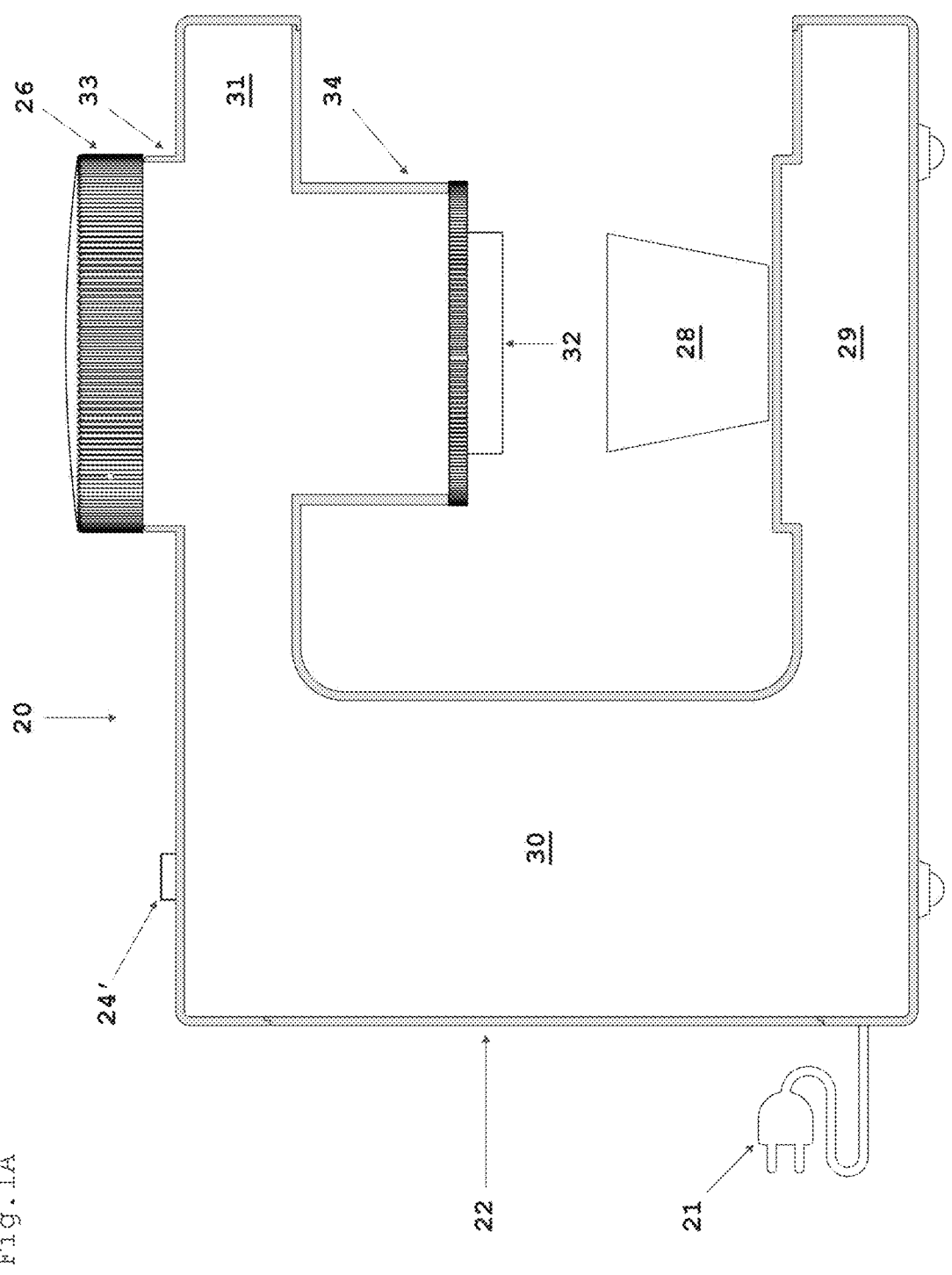
FIG. 1*a*, which shows an external side schematic view of a first example of a semi-automatic machine for crushing frozen food substances, according to the invention.
Figure 1B:
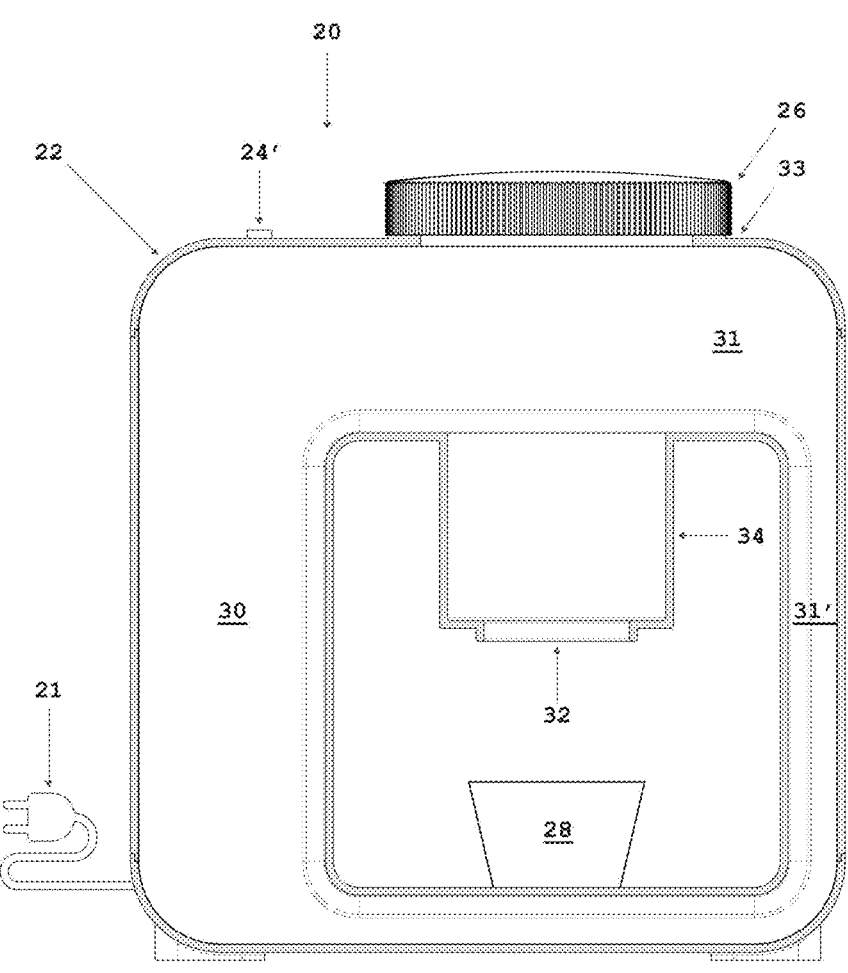
FIG. 1*b*, which shows an external side schematic view of a second example of a semi-automatic machine for crushing frozen food substances, according to the invention.

The above-said figures show the semi-automatic machine for crushing and then for collecting frozen food substances externally for their subsequent food use, that is to be eaten, such as fruit smoothies, slushes, ice creams, etc. and/or for the preparation of foods to be eaten after, such as for example condiments or seasonings, and in particular it is represented in three of embodiments thereof, which fall in the same invention.

The semi-automatic machine 20, in the various embodiments thereof, is of the electric type, and powered at low or high voltage, such as for example by the domestic power grid through an electric cable 21 or by an internal battery (not shown) and it is substantially constituted by a support cabinet 22 for containing and supporting the various component elements of the same machine, which component elements are constituted by at least one control and command electronic circuit board 23, by at least a first electric rotating actuation means 24, by motion transmission means 25, by at least one unit 26 for closing and upper pushing of the food substance to be crushed, and at least one unit 27 for crushing and discharging such a food substance, which when crushed is deposited in a independent external collecting container 28 which may be placed and supported by the support cabinet 22.

Such a support cabinet 22 is constituted by a base 29, which in a side part thereof, extends upwards with a first side compartment 30, which in turn extends frontally with its upper part with a second horizontal upper compartment 31, which is parallel to said base 29 and preferably with the same length, and is provided with at least one vertical through hole 32, preferably with a cylindrical section, which extends upwards with a first short cylinder 33 and possibly downwards with a second cylinder 34, longer than the first one, both of said cylinders 33 and 34 being provided with quick fastening system 35, as for example a Bayonette, for the purpose that will be describe later.

Such a base 29 is adapted to be leant on a flat surface and contains and supports within said control and command electronic circuit board 23 which preferably comprises at least one microprocessor (not shown), and an electronic component (inverter, not shown), adapted to convert the necessary voltage to power the machine 20 from DC voltage (for example 12 VDC) to AC voltage (for example 230 VAC).

Such base 29 and upper compartment 31 may be joined together by a side vertical wall 31', creating a free area accessible from the outside, positioned under the cylinder 34. Said first side compartment 30 contains and supports inside said at least first electric actuation means 24 inside.

Said second upper compartment 31 contains inside said motion transmission means 25, and the vertical through hole 32 thereof, together with its two cylindrical extensions 33 and 34, it contains and supports upperly in a removable way said at least closing and pushing unit 26 of the food substance to be crushed, and at the bottom thereof said at least unit of crushing and discharging 27 of such a frozen food substance.

Said first electric actuation means 24 is constituted by an electric motor which may be selectively powered at low voltage, such as 12/24 V or at 230V DC voltage of the domestic electric grid, through the use of an electronic means (inverter Said actuation means 24 is connected through said motion transmission means 25 to said closing and pushing unit 26 of the food substance to be crushed, or to said crushing and discharging unit 27 of said frozen substance, in such a way as to transmit a rotational movement to the unit to which it is connected, such an actuation means 24 being also controlled and commanded by the control and command electronic circuit board 23, to which it is connected with the interposition of an electronic means (inverter) adapted to convert the AC voltage to DC voltage, by means of commands placed on the external part of said support cabinet 22, in such a way that when the machine is connected to the power supply it may be set in the rest state thereof or in the operating state thereof.

In the various figures, in all the embodiments of the machine 20, it may be noted that said at least unit for closing and pushing the food substance to be crushed, and said unit 27 for crushing and discharging such a frozen food substance are removable joined and cooperating to each other, as it will be described below.

Now, it is described a machine 20 in a first embodiment thereof, shown in particular in FIGS. 1-6c.

Figure 2:
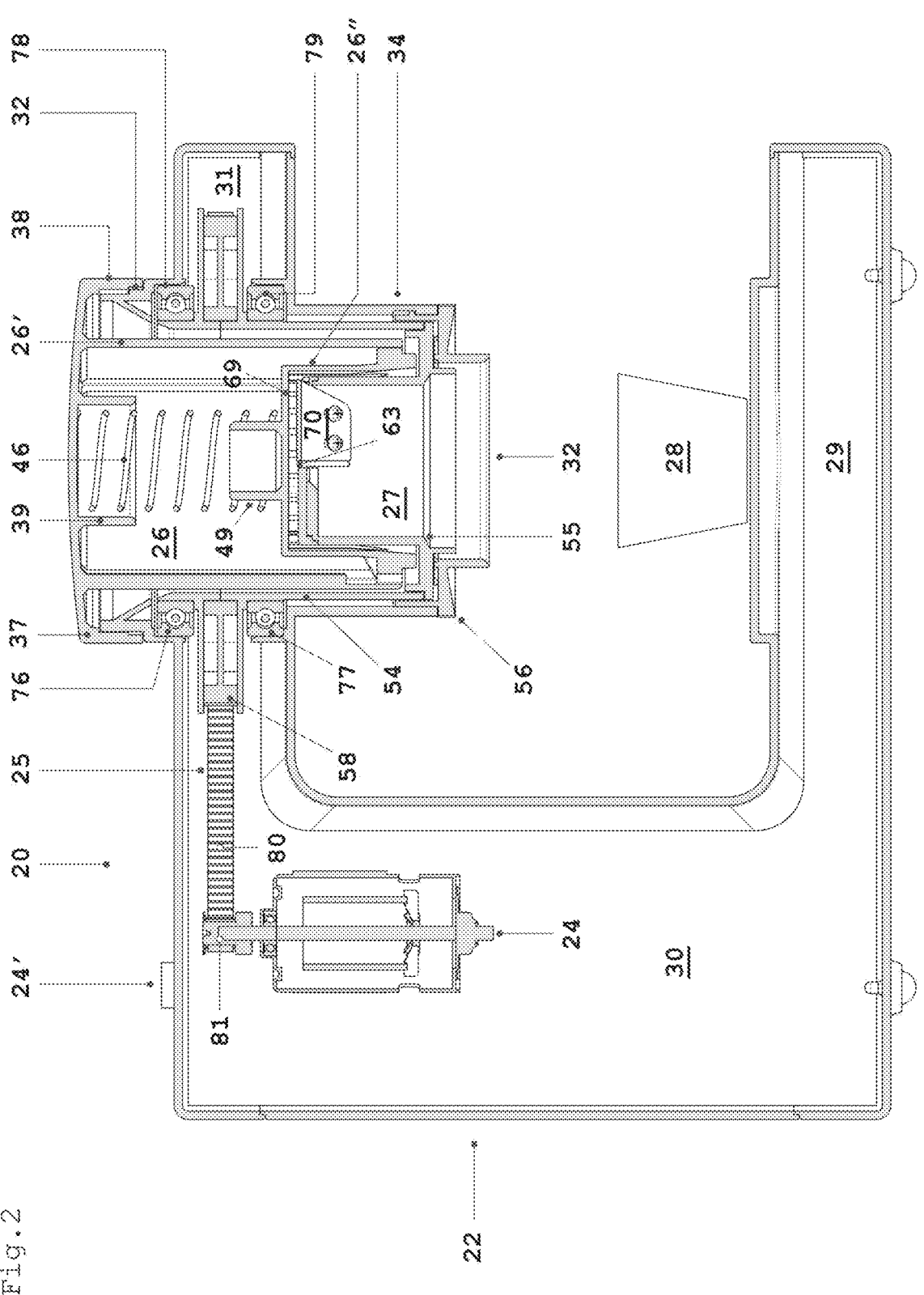
FIG. 2, which shows a side section view of a first embodiment of the machine of FIG. 1.
Figure 3:
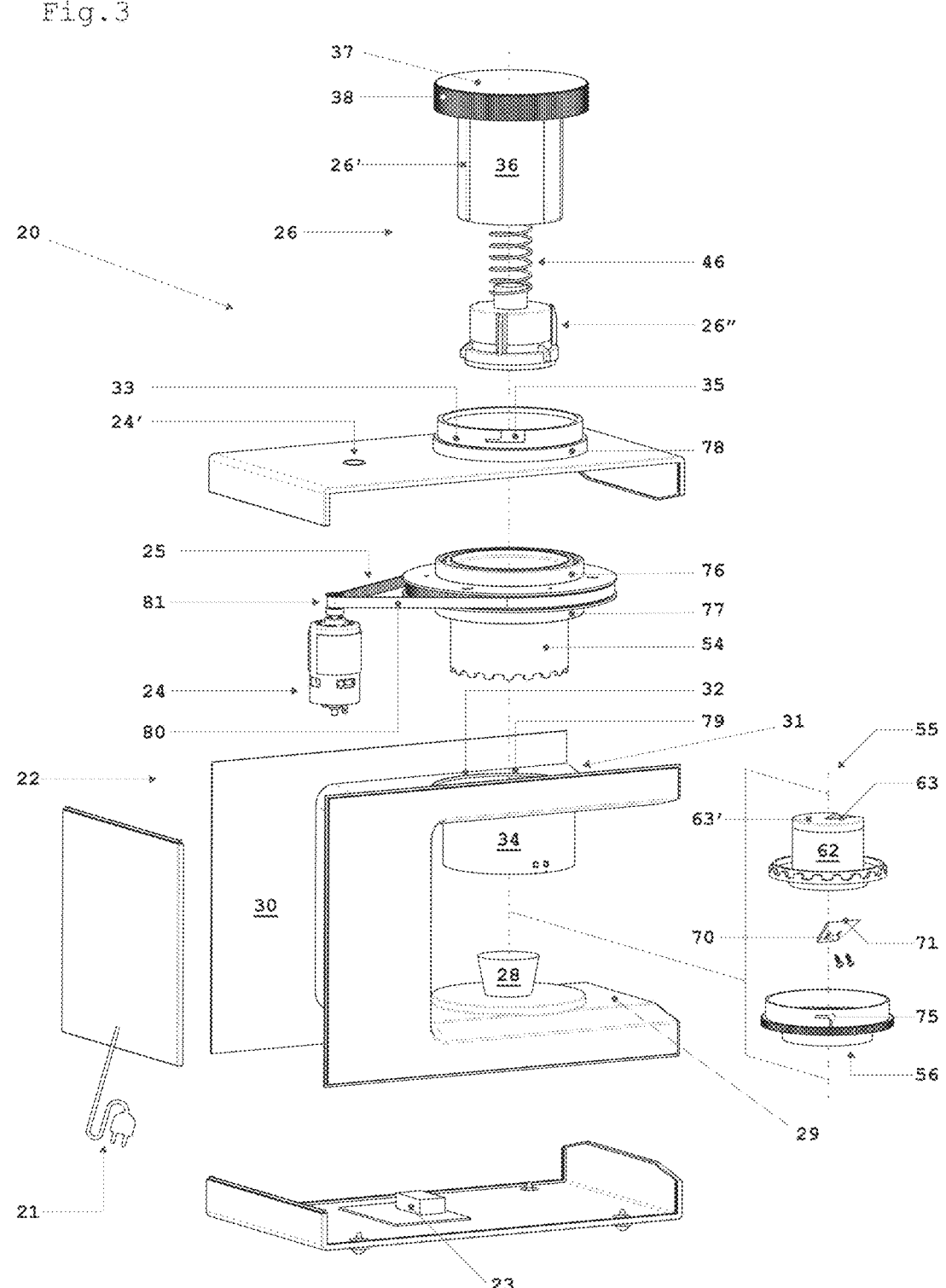
FIG. 3, which shows an exploded view of the main component elements of the machine of FIG. 2.
Figure 4:
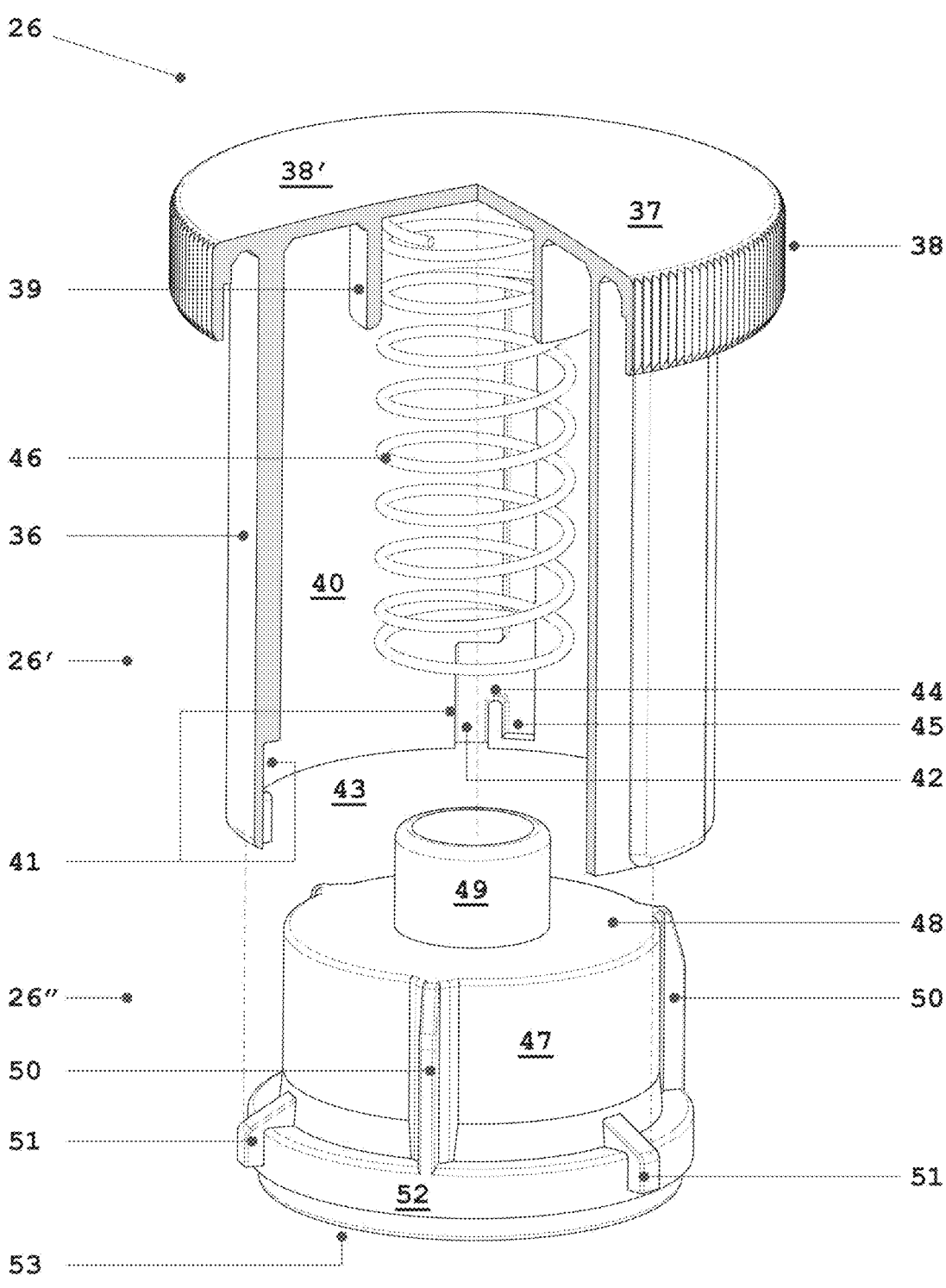
FIG. 4, which shows a perspective view, with a cross-section of some details, of a first group of component elements of FIG. 3.
Figure 5:
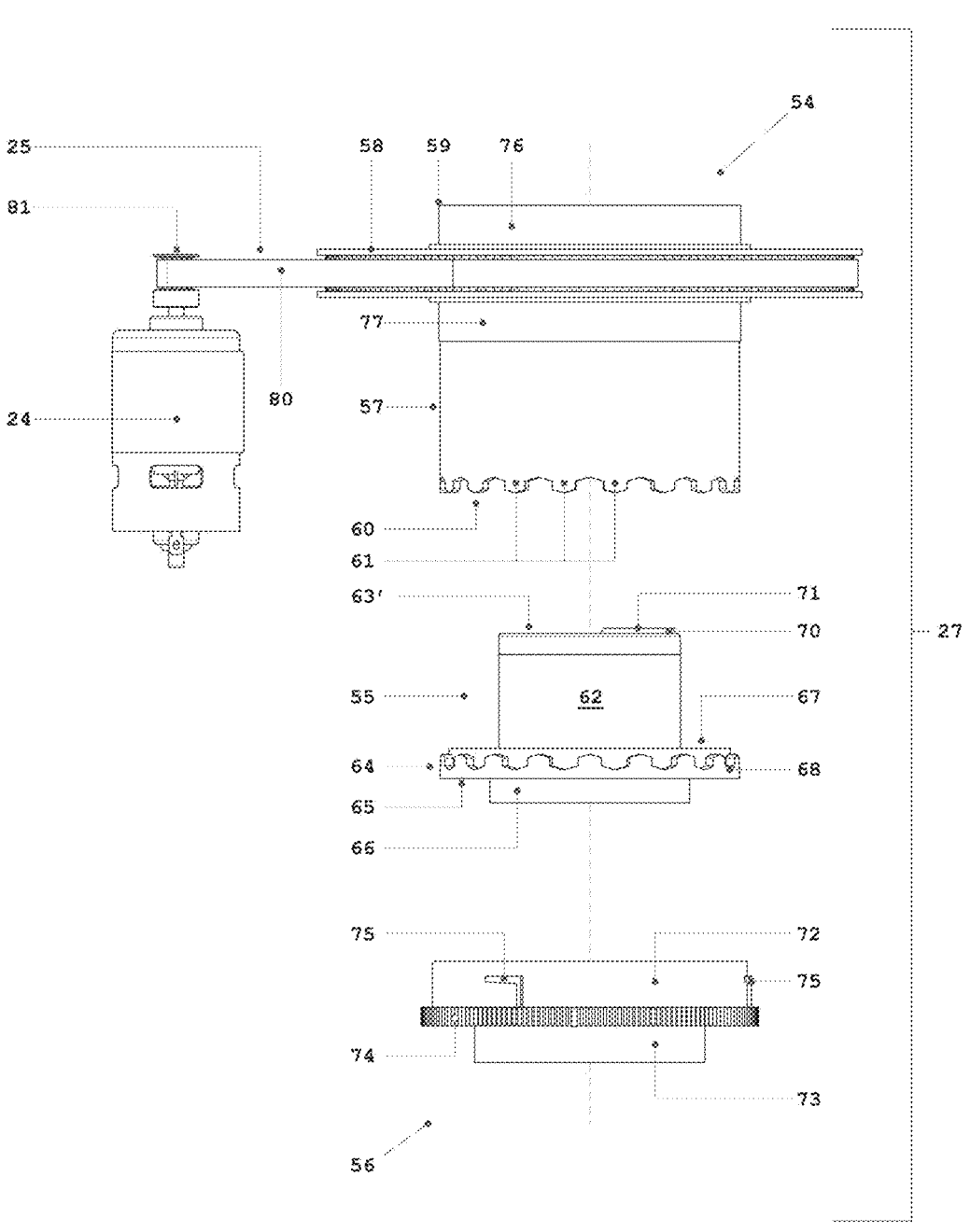
FIG. 5, which shows a side view, with some exploded details, of a second group of component elements of FIG. 2.

Said closing and pushing unit 26 of the food substance to be crushed, shown in particular in FIGS. 2 and 3, comprises a first shaped hollow element 26' and a second shaped hollow element 26" joined in a movable way to each other, by interposing a vertical elastic pushing and contrasting means 46, as for example a sprung means, that is a contrast spring. This first shaped hollow element 26' is constituted by a first cylindrical hollow vertical guide body 36, which is open at the bottom and provided at the top with a second short closing cylindrical concentric element 37, with a diameter greater than the first cylinder 36, closed at the top thereof with a horizontal flat surface 38' and with the external vertical surface 38 preferably knurled and internally provided with a quick fastening system (not shown), as for example of the Bayonette type.

Said first cylinder 36 also comprises concentrically inside a third hollow cylinder 39 extended downwards and opened at the bottom thereof, with reduced seize with respect to the same first cylinder.

Such a first cylinder 36 has a diameter such as to be able to be inserted in said hole 32, whereas the second upper cylinder 37 has a diameter such as to be able to couple and engage, by means of the relative quick fastening systems, to the upper cylindrical extension 33 of the same hole 32.

The first cylinder 36 is also provided, on the internal surface 40 thereof, with at least one vertical groove 41 shaped with a first vertical section 42 extending from the lower opening 43 upwards flanked and connected by a horizontal section 44 to a further blind vertical section 45 extended parallel to the first section upwards for almost the entire height of the same cylinder 36.

Said second shape hollow element 26" is made of piece and is constituted by a hollow cylindrical body 47, opened at the bottom thereof, and provided concentrically on its upper horizontal surface 48 with a second cylinder 49 extended upwards, with a diameter smaller than the cylindrical body 47, and is provided at its lower part 53 with an external ring 52 of reduced height and with a diameter greater than its one, which in turn has at least on external vertical straight rib 51 extending upwards, said hollow cylindrical body 47 being provided internally with at least one rectilinear vertical groove 50, which extends for its entire height.

Such a second shaped hollow element 26" is shaped in such a way to be able to slide inside said first shaped hollow element 26', that is the cylindrical body 47 has an external diameter slightly smaller than the internal one of the hollow cylinder 36, and the at least vertical rib 51 is sized in such a way to be able to couple with and slide free without angular play inside the at least vertical groove 41.

The at least rib 51 is able to be inserted in the first vertical section 42, for translating through the horizontal section 44, by means of a rotation of the cylindrical body 47 along with its vertical axis, and to be positioned in the second blind vertical section 45, of the at least groove 41, in such a way that the first hollow element 26' and the second hollow element 26" may slide with respect to each other, without being able to disengage involuntarily, except with a disengagement opposite to that necessary for their coupling. This at least rib 51 has a lower height than the height of said horizontal section 44 of the groove 41, in order to be able to rotate inside.

The pushing and contrasting means 46 is interposed between the two hollow elements 26' and 26", so as to be locked between the two concentric cylinders 39, of the first element 26', and 49 of the second hollow element 26", keeping them spaced apart if a compression of a certain force is not voluntarily exerted.

Said crushing and discharging unit 27 (See FIG. 5) is substantially constituted by a first component element 54 for the motion transmission, a crushing means 55 and a second component element 56 for safety and for lower partial closing of the same crushing unit 27. Such a first component element 54 for the motion transmission, in a first example of embodiment thereof, is constituted by a hollow vertical cylindrical body 57, provided concentrically in its external part with a second cylindrical body 58, with a greater diameter than the cylindrical body 57, shaped externally as a pulley preferably provided with a vertical toothing on its entire external perimeter, which leaves free an upper portion 59 of cylindrical body 57, whereas the lower edge 60 of cylindrical body 57 is shaped with a regular toothing 61 extended downwards.

Outside to the vertical cylindrical hollow body 57, there is inserted at least one pair of bearings 76,77, arranged flush against said pulley 58, of which the first one 76 is arranged above the same pulley 58, whereas the other one 77 is arranged below the same pulley 58. Said crushing means 55 is constituted by a hollow cylindrical body 62, open at the bottom thereof and provided with at least one opening 63 (shown in FIGS. 2 and 3) on its upper surface 63', and with a concentric ring 64 of greater diameter arranged on its lower part 65, by leaving free a lower portion 66 of the same cylindrical body.

The upper profile 67 of said ring 64 is shaped with a regular toothing 68.

Such a cylindrical body 62 of the crushing and discharging unit 27 has an external height slightly lower than the height of the cavity 69 of the second hollow element 26" of the loading unit.

The concentric ring 64 of the cylindrical body 62 of the crushing means 55 of the crushing and discharging unit 27 has a diameter identical to the one of the lower profile 60 of the first element 54 of the same crushing and discharging unit 27, and the relative regular toothing 61 and 68 are shaped and sized to engage each other, by creating a single body between the element 54 and the crushing means 55.

At each said opening 63 at least one blade 70 is fixed to, with the cutting part 71 turned upwards and parallel to said surface 63', and which leaves the same opening 63 partially free.

The hollow cylindrical body 62 thus becomes a blade holder element.

Said second component element 56 for safety and for partial lower closing of the crushing unit 27 is shaped with two hollow cylinders 72,73 concentric to each other, of which, the upper one 72 is sized larger than the lower one 73, and in which such a first upper cylinder 72 is lowerly provided with an external knurling 74, or equivalent processing, for increasing the grip thereof, and at the top thereof it is provided with external quick fastening means 75, as for example of the Bayonette type.

Such an upper cylinder 72 is sized to be able to couple and detachably engage, and vice versa, with the second lower cylinder 34 of the vertical hole 32 of the support cabinet 22, through the respective said quick fastening means opportunely sized, for protecting the component parts arranged above it and in order to be able to extract the other components of the crushing and discharging unit 27, if it is required by any required maintenance or for washing the same one.

The second lower hollow cylinder 73 has an internal diameter sized such in a way that the lower portion 66 of the hollow cylindrical body 62 of said crushing means 55 may be housed inside it without interference, when the machine 20 is assembled, as shown in particular in FIG. 2.

This crushing and discharging unit 27 so constituted is assembled and fixed on the support cabinet 22, in such a way that the first component element 54 for the motion transmission and the crushing means 55 are joined and integral to each other by means of the respective toothing, and that they are released from the closing and pushing unit 26 and from the second component 56 for safety and for the partial lower closing of the same crushing unit 27, and that the part of cylindrical body 57 comprising the pulley 58 and the two bearings 76,77 are arranged inside the compartment 31 of the same support cabinet 22.

Said bearings 76,77 are inserted and locked in respective seats 78,79, obtained inside the compartment 31 concentrically to said hole 32.

In this way the crushing and discharging unit 27 is constrained only to the two said bearings 76, 77, therefore it is able to rotate without impediments with a vertical axis.

As previously said, the first electric actuating means 24 and the crushing and discharging unit 27 are joined to each other by motion transmission means 25, which, in a first embodiment thereof, are constituted for example by a toothed belt 80, or a chain or an equivalent element.

Such a toothed belt 80 is arranged and tensioned between an upper pulley 81 with vertical axis of the first electric actuation means 24 and the pulley 58 of the crushing and discharging unit 27, in such a way that thanks to the movement created by the actuation means 24, when activated, the pulley 58 may rotate with a vertical axis thanks to said bearings 76, 77 and consequently also the first component element 54 for the motion transmission and the crushing means 55.

Figure 22:
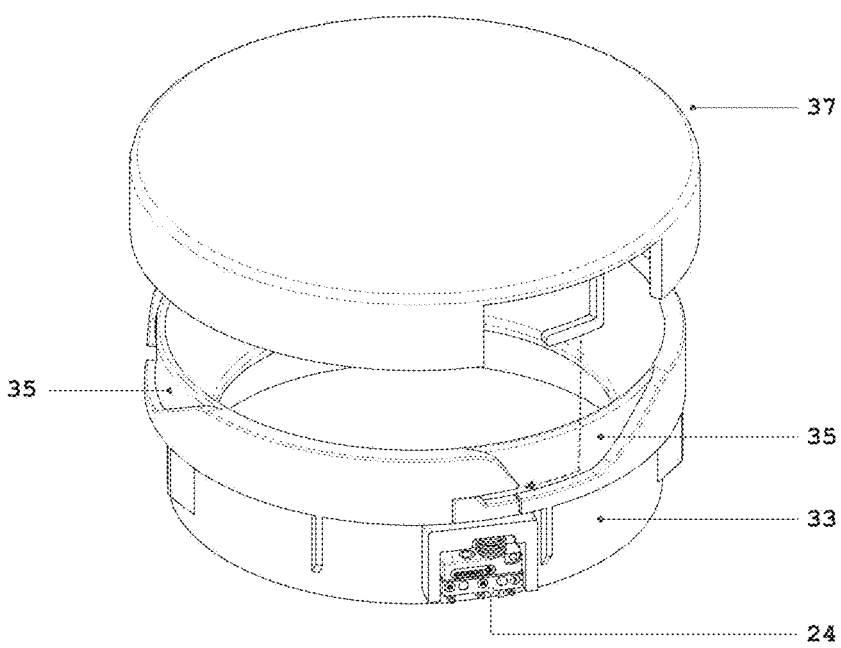
FIG. 22, which show an exploded perspective top view of a group of component elements in a second example of embodiment thereof, common to all three of the aforementioned embodiments of the semi-automatic crushing machine, according to the invention.

Such an electric actuation means 24 may be powered and actuated by electric starting means 24', as for example a push button or a switch, arranged externally to the support cabinet 22 (See FIGS. 1-2) and/or arranged near the upper cylindrical extension 33 of the hole 32 (see FIG. 22), so that the closing and pushing unit 26 activates it when it is pressed and engaged with the quick fastening means to the upper cylinder 33 of the same support cabinet 22.

The frozen food substance 87 to be crushed is stored at the frozen state in an external storage container 82, which is constituted by a hollow cylindrical body 83 shaped closed at its upper and lower horizontal end portions, of which at least one may be opened by the user with the use of hands only.

This shaped hollow cylindrical body 83 is shaped and sized in such a way to be able to be inserted inside the hollow cylindrical body 47 of the second hollow shaped element 26" of the closing and pushing unit 26, through its lower opening when the same closing and pushing unit 26 is disassembled from the support cabinet 22, for then being housed therein without its subsequent possible rotational movements thanks to at least one rib positioned on the external surface of the hollow body 83, which rib is shaped and sized for engaging with said vertical rectilinear groove 50. Furthermore, by using at least one external rib on the container 82 and at least one groove on the cylindrical body 47, and not vice versa, there is no waste of frozen food substance 87, since it is so possible to scrape with the blade 70 for the entire internal depth of the container 82. In the case ribs would be present inside the container 82, obviously, it would not be possible to scrape the frozen substance 87 with the blade 70 for the entire internal depth of the container 82, since the same ribs would interfere, causing waste of food substance 87.

In the condition in which the crushing and discharging unit 27 is assembled to the support cabinet 22, and the closing and pushing unit 26 is disassembled from this latter, it proceeds by opening at least one horizontal end portion of the storage container 82, then positioning this latter inside the hollow cylindrical body 47, with the at least opened opening positioned below in correspondence of the opening of the same hollow cylindrical body 47. The second shaped element 26" is then positioned inside the first shaped element 26' of the closing and pushing unit 26, as described above, with the pushing and contrasting means 46 interposed.

As shown in FIG. 6a, the machine 20 is powered, and the closing and pushing unit 26, comprising the storage container with the frozen food substance 87 to be crushed, is assembled in the support cabinet 22, as explained above, by activating the crushing and discharging unit 27 in rotation by means of the actuation means 24 actuated by the switch 24'.

As shown in FIG. 6b, thanks to the pushing and contrasting means 46, the frozen substance 87 contained in the container is pushed onto the at least blade 70, which, by rotating, crushes the same substance and penetrates inside it, since the shaped element 26" slides downwards along the at least vertical groove 41, and then such a crushed food substance 88 falls through the opening 63 into the collecting container 28 positioned below it, on the base 29 of the cabinet 22.

Said element 26" acting as a vertical guide element for the container 82.

Once the crushing step of the entire frozen food substance 87 contained in the storage container 82 has been completed, as shown in FIG. 6c, the closing and pushing unit 26 is disassembled, thus being able to replace the container 82 and to proceed with a subsequent crushing, and possibly washing the internal crushing and discharging components 27, both for its hygiene and in order not to contaminate the taste of the frozen food substances 87 which will be subsequently crushed.

The rotation speed of the crushing and discharging unit 27, set thanks to the control and command electronic circuit board 23, and the number of blades 70 are variable according to the type of frozen food substance 87 to be crushed and the type of desired crushing, by means of setting means (not shown), constituted as for example push-buttons.

Figure 7A:
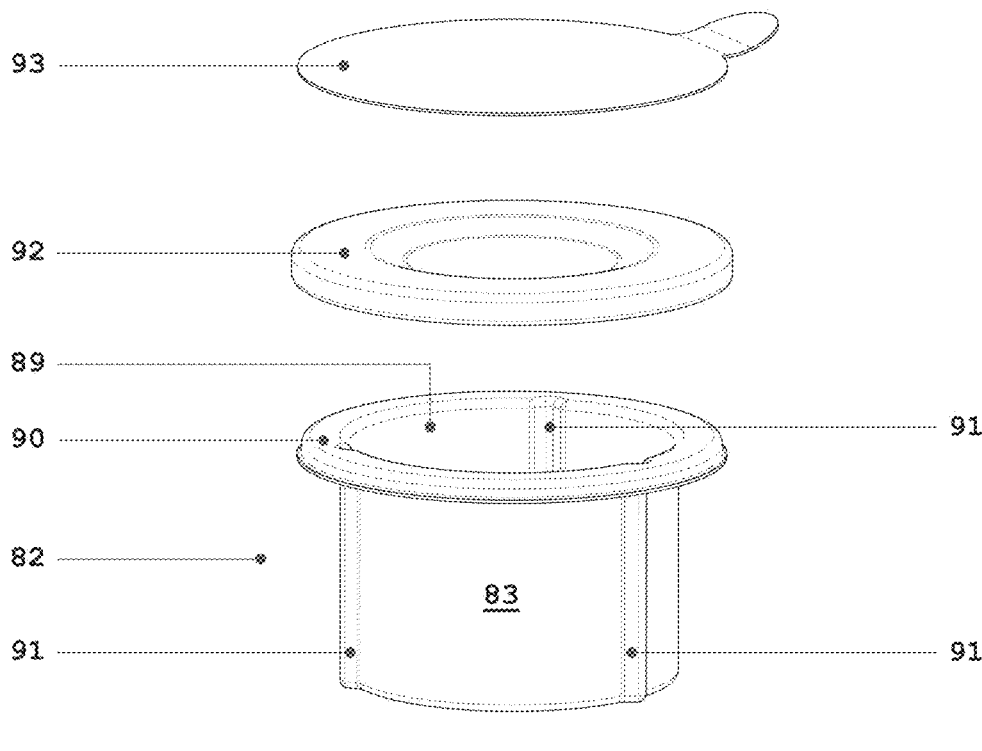
FIG. 7*a*, which shows an exploded perspective view of a first example of a storage container for frozen food substances to be crushed, in the opened position thereof.
Figure 7B:
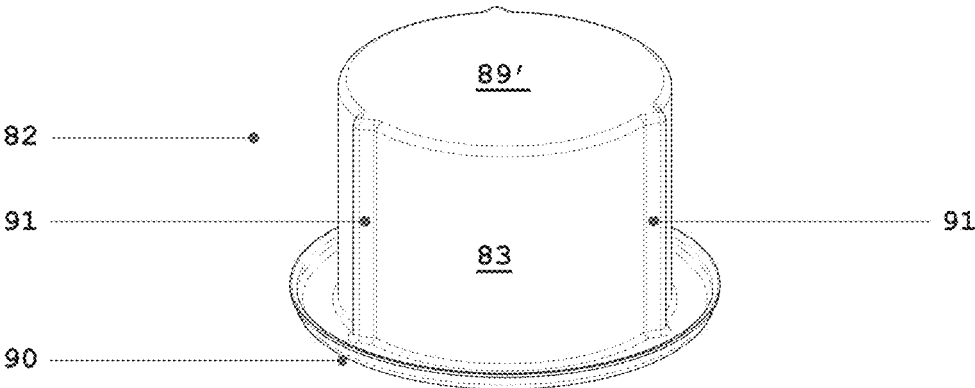
FIG. 7*b*, which shows a perspective view of the storage container for frozen food substances to be crushed of FIG. 7*a*, in the extraction position of said food substance.

The FIGS. 7a and 7b show a first possible non-limiting example of a storage container 82, respectively with an exploded perspective view in the storage position, and with a perspective view in the extraction position of the same food substance, which container 82 may be used in particular with the first embodiment of the machine 20.

Such a container 82 is made of rigid or semi-rigid material adapted to contain frozen foods and preferably of the recyclable type, and is constituted by said hollow cylindrical body 83 which has at least one transversal end portion 89 opened and shaped with an externally flat edge 90 and extended laterally by slightly bending, and the other end portion 89' closed and shaped with a flat or inward conical surface, such a hollow body 83 having on its external vertical surface at least one external vertical rib 91.

As previously described, such a container 82, in particular in this embodiment example, is shaped and sized to be housed inside the hollow cylindrical body 47 and not to rotate therein, thanks to the interference created by the insertion of the at least rib 91 in the at least groove 50.

In the preservation state of the frozen substance 87, such a container 82 is closed by means of a flat rigid cylindrical cap 92 applied by interlocking to this shaped edge 90, suitably sized or with a plastic cylindrical film 93, such as a film, heat-sealed outside to the shaped edge 90.

The container 82, thus constituted, may be easily opened by any user, with only the use of the hands, to then be inserted inside the machine 20, as explained above.

Figure 8:
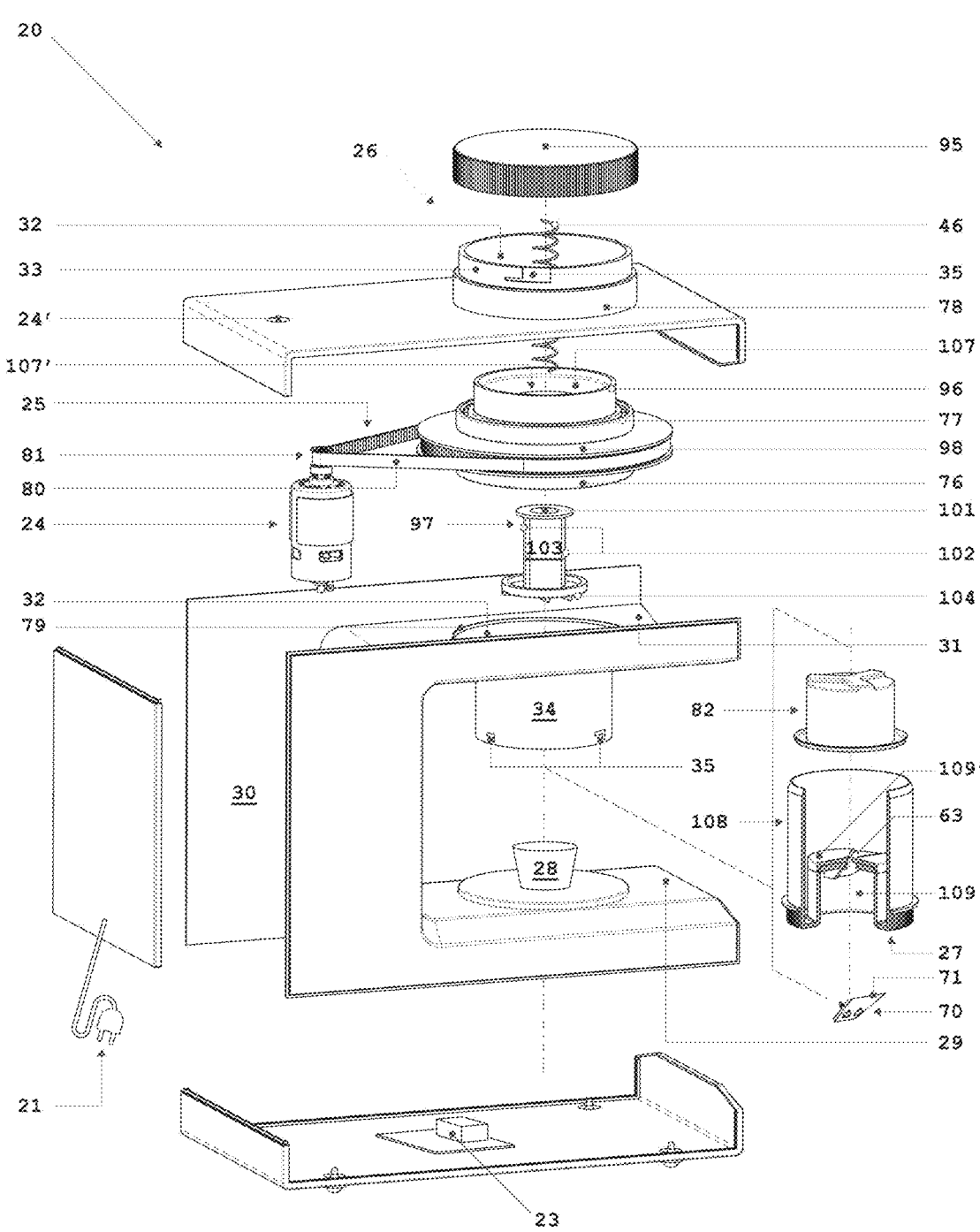
FIG. 8, which shows an exploded view of the main component elements of the machine FIG. 1, in a second embodiment thereof, with an example of a storage container for frozen food substances to be crushed.
Figure 9:
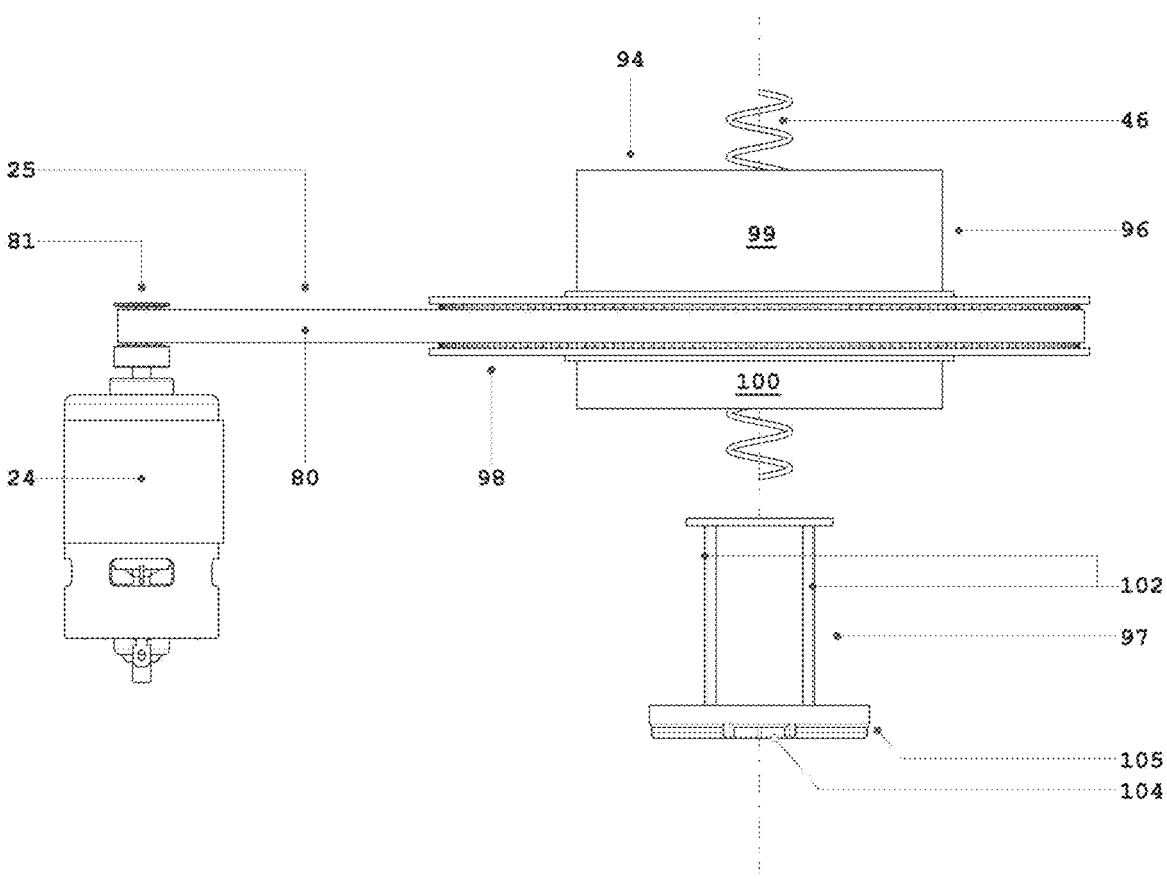
FIG. 9, which shows a schematic side view of the first group of component elements of the machine FIG. 8, in a first example thereof.
Figure 10:
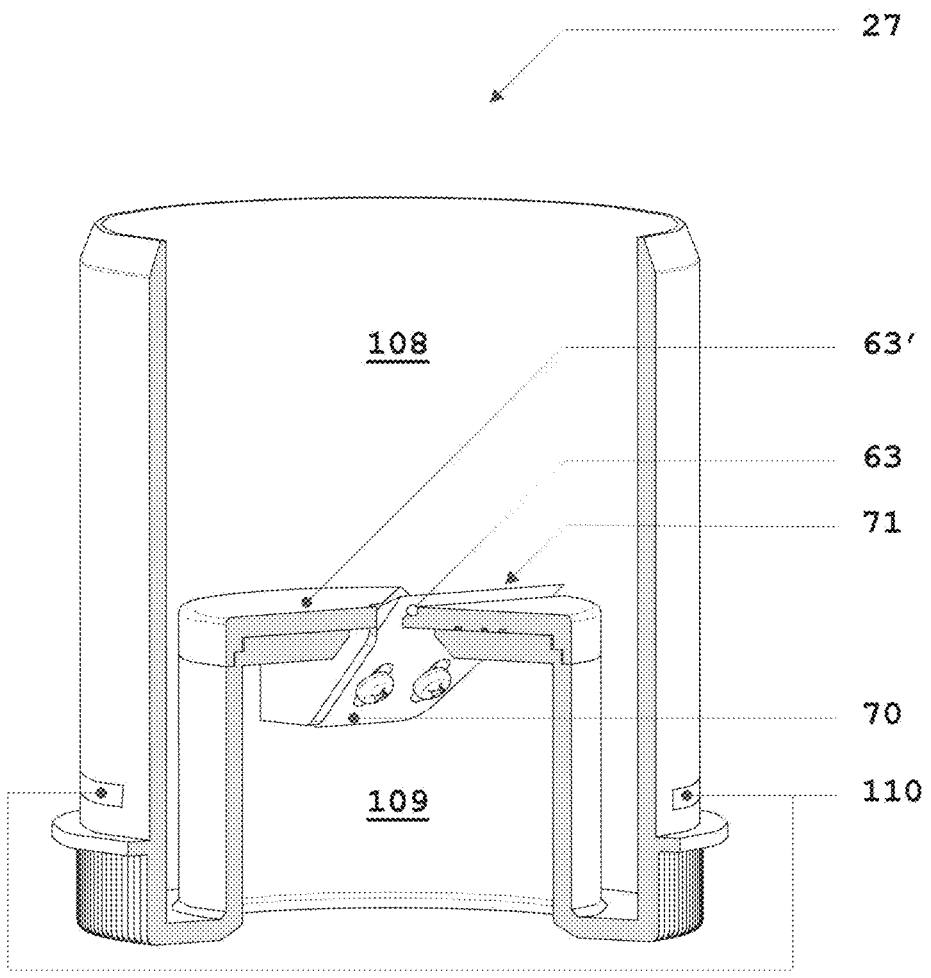
FIG. 10, which shows an enlarged and cross-section view of an element of FIG. 8.

Now it is described the machine 20 in the second embodiment thereof, shown particularly in FIGS. 8-10.

The closing and pushing unit 26 of the frozen substance to be crushed (see FIGS. 8 and 9) comprises at least one central component element 94 for the motion transmission and at least one upper closing element 95, between which at least one vertical pushing and contrasting means 46 is interposed, as for example a contrast spring.

Such a central element 94 for the motion transmission is constituted by a first external shaped hollow cylindrical body 96, and by a second internal shaped hollow cylindrical body 97.

Said first hollow cylindrical body 96, in a first embodiment thereof, is concentrically provided in its external part with a third cylindrical body 98, of greater diameter than the cylindrical body 96, externally shaped as a pulley, preferably provided with a vertical toothing along the entire outer perimeter thereof, which leaves free an upper cylindrical portion 99 and a lower cylindrical portion 100 of the same hollow cylindrical body 96. Said hollow cylindrical body 96 is provided with an internal through hole 107 on the internal surface of which at least one vertical shaped groove (not shown) is provided. At least one bearing 76, 77 is inserted externally to each upper 99 and lower 100 cylindrical portion, which is then arranged abutting against the pulley 98.

Said second internal shaped hollow body 97 is provided with an upper vertical blind concentric hole 101, with at least one external vertical rib 102 on its external vertical surface 103 and at least one lower external shaped groove 104 on its enlarged lower surface 105.

Such a rib 102 is equal in number with respect to the number of grooves in the internal through hole 107, and is shaped and sized to be coupled with them, and may then slide free therein without angular play. Such a groove 104 may be shaped with any shape, but with at least one rectilinear segment, such as for example three equal rectilinear portions arranged in a radial pattern and joined at one end portion thereof.

Such a second hollow body 97 is inserted in the internal through hole 107 of the first hollow body 96, as already described, in such a way that it may slide therein thanks to the coupling of the rib 102 and the groove of the same through hole 107, without that them being inadvertently uncoupled.

Such a central moving means 94, thus constituted, is positioned inside the upper compartment 31 with the bearings 76, 77 inserted and locked in respective seats 78, 79, obtained inside the compartment 31, in such a way that said central moving means 94 may rotate freely with a vertical axis with respect to the support cabinet 22 around said hole 32. The pulley 81 of the actuation means 24 is joined to the pulley 98 through said motion transmission means 25, which are constituted for example by a toothed belt 80, or a chain or an equivalent element.

Said upper closing element 95 is constituted by a cylindrical cap, knurled externally, and provided on its inner wall with quick fastening means (not shown), as for example of the Bayonette type, and furthermore provided concentrically inside with a small downwardly extended cylinder (not shown) which has approximately the same diameter of the blind hole 101 of the second hollow body 97.

Such a cap 95 is sized and shaped in such a way as to be able to be coupled with the upper cylindrical portion 33 of the compartment 31 and to be locked therein by means of respective quick fastening means.

This pushing and contrasting means 46 is previously inserted with its lower part in said hole 101 and with its the upper part in the small concentric cylinder of the cap 95.

Said crushing and discharging unit 27 (See FIG. 10) is realized with two cylindrical hollow bodies 108 and 109 concentric and joined at the bottom to each other, of piece or removably to each other, of which the first external cylindrical body 108 is hollow at its upper part, whereas in its external lower part is provided with a knurling or equivalent and with quick fastening means 110, as for example of the Bayonette type, and of which the second internal cylinder 109 has a diameter and height lower than the first external cylinder 108, and is hollow at the bottom thereof, furthermore, on its upper horizontal surface 109' it has at least one opening 63, to which at least one blade 70 is fixed, with the cutting part 71 thereof turned upwards and horizontal, and which leaves the same opening 63 partially free.

The internal cylindrical body 109 thus becomes a blade holder element.

Such a crushing and discharging unit 27 is inserted in the second lower cylinder 34 of the vertical hole 32 of the support cabinet 22, and locked in position by means of the respective said quick fastening means.

The toothed belt 80 is arranged and tensioned between the upper pulley 81 with vertical axis of the first electrical actuation means 24 and the pulley 98 of the central moving means 94, in such a way that thanks to the movement created by the actuation means 24, when it is operating, the pulley 98 may rotate with vertical axis thanks to said bearings 76, 77, and consequently also the hollow body 97, by allowing to it to slide vertically.

Such an electric actuation means 24 may be powered and actuated by electric starting means 24', as for example a push-button or a switch, arranged externally to the support cabinet 22 and/or arranged near the upper cylindrical extension 33 of the hole 32 so that the closing and pushing unit 26 activates it when it is engaged with the rapid fastening means to the upper 33 or lower 34 cylinder of the same support cabinet 22.

The frozen food substance to be crushed is stored at the frozen state thereof in a storage container 82, which is constituted of a cylindrical shaped hollow body 83 closed at its upper and lower end portions, of which at least one is able to be opened by the user with the use of hands only.

Such a shaped hollow cylindrical body 83 is shaped and sized in such a way to be able to be inserted and housed inside the hollow cylindrical body 108 of the crushing and discharging unit 27, through its upper opening, and leant on the upper surface of the internal cylindrical body. 109, when such an unit is disassembled from the support cabinet 22. Subsequently, such a crushing and discharging unit 27 is assembled to the support cabinet 22.

By assembling such a crushing and discharging unit 27 on the support cabinet 22, the pushing and contrasting means 46 pushes the hollow body 97 against the upper transversal surface 111 of the container 82, which has an external rib that is shaped and sized to engage with said groove 104 of the same hollow body 97, thus avoiding possible rotational movements of the container 82 independent with respect to the rotation of the hollow body 97.

Said body 97 acts as vertical guide element for the container 82.

By using at least one external rib on the container 82 and at least one groove 104 on the hollow body 97, and not vice versa, there is no waste of frozen food substance, since it is thus possible to scrape the entire internal depth of the container 82 with the blade 70.

In the case there are internal ribs in the container 82, obviously, it would not be possible to scrape the frozen substance with the blade 70 for the entirety of its internal depth, as the same ribs would interfere, causing waste of food substance.

For proceeding with the crushing of the frozen substance contained in the container 82, that is before placing this latter inside the external hollow cylindrical body 108, at least one horizontal end of the same storage container 82 is opened, by positioning then it with the at least opened end portion leant on the upper surface of the internal hollow body 109.

The machine 20 assembled as described above is powered, with the container 82, provided with the frozen food substance to be crushed, arranged inside the crushing and discharging unit 27.

The actuation means 24, activated by the starting means 24′, rotates the central moving means 94 with a vertical axis, which consequently rotates the container 82 engaged with the hollow body 97, as above described, while the pushing and contrasting means 46 pushes downwards this latter.

Proceeding in this way, the blade 70 penetrates in the frozen food substance by crushing it and letting it fall into the hole 63, so that such crushed food substance deposits in a possible collecting container 28 (not part of the present invention) positioned on the base 29 of the support 22.

Once the crushing step of the entire frozen food substance contained in the storage container 82 is completed, the crushing and discharging unit 27 is disassembled, thus being able to replace the container 82 and to proceed with a subsequent crushing, and possibly washing the same internal crushing and discharging components 27, both for its hygiene and for not contaminating the taste of frozen food substances that will be crushed later.

The rotation speed of the hollow body assembly 97, set thanks to the control and command electronic circuit board 23, and the number of blades 70, are variable according to the type of frozen food substance 87 to be crushed and the type of crushing desired, by means of setting means (not shown), constituted as for example by push-buttons.

Figure 11A:
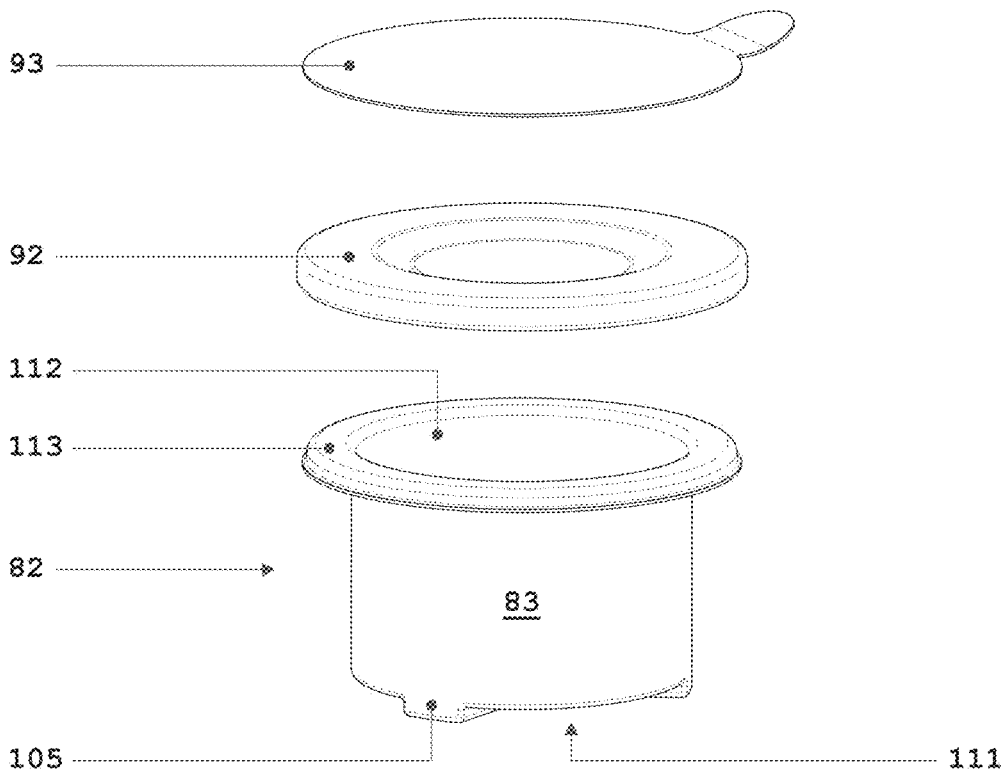
FIG. 11a, which shows an exploded perspective view of a second example of the storage container for frozen food substances to be crushed, in an opened position thereof, already shown with a perspective view in FIG. 8.
Figure 11B:
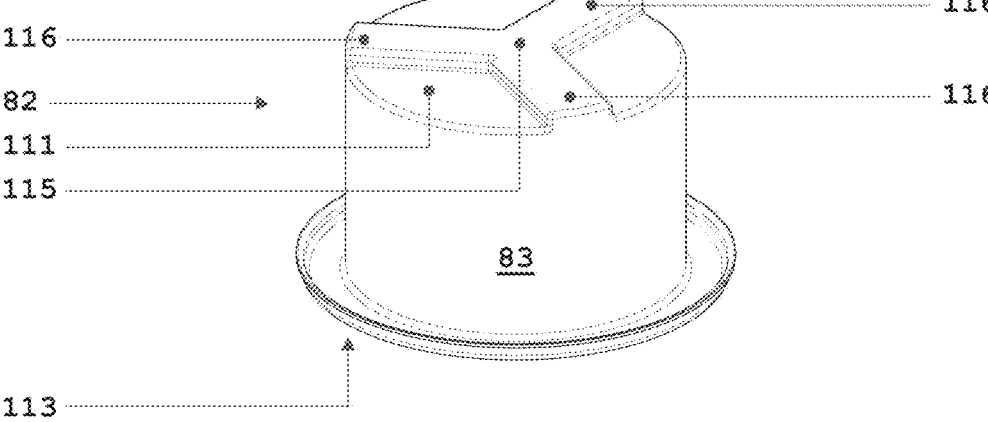
FIG. 11b, which shows a perspective view of the storage container for frozen food substances to be crushed of FIG. 11a in the extraction position of said food substance.
Figure 12:
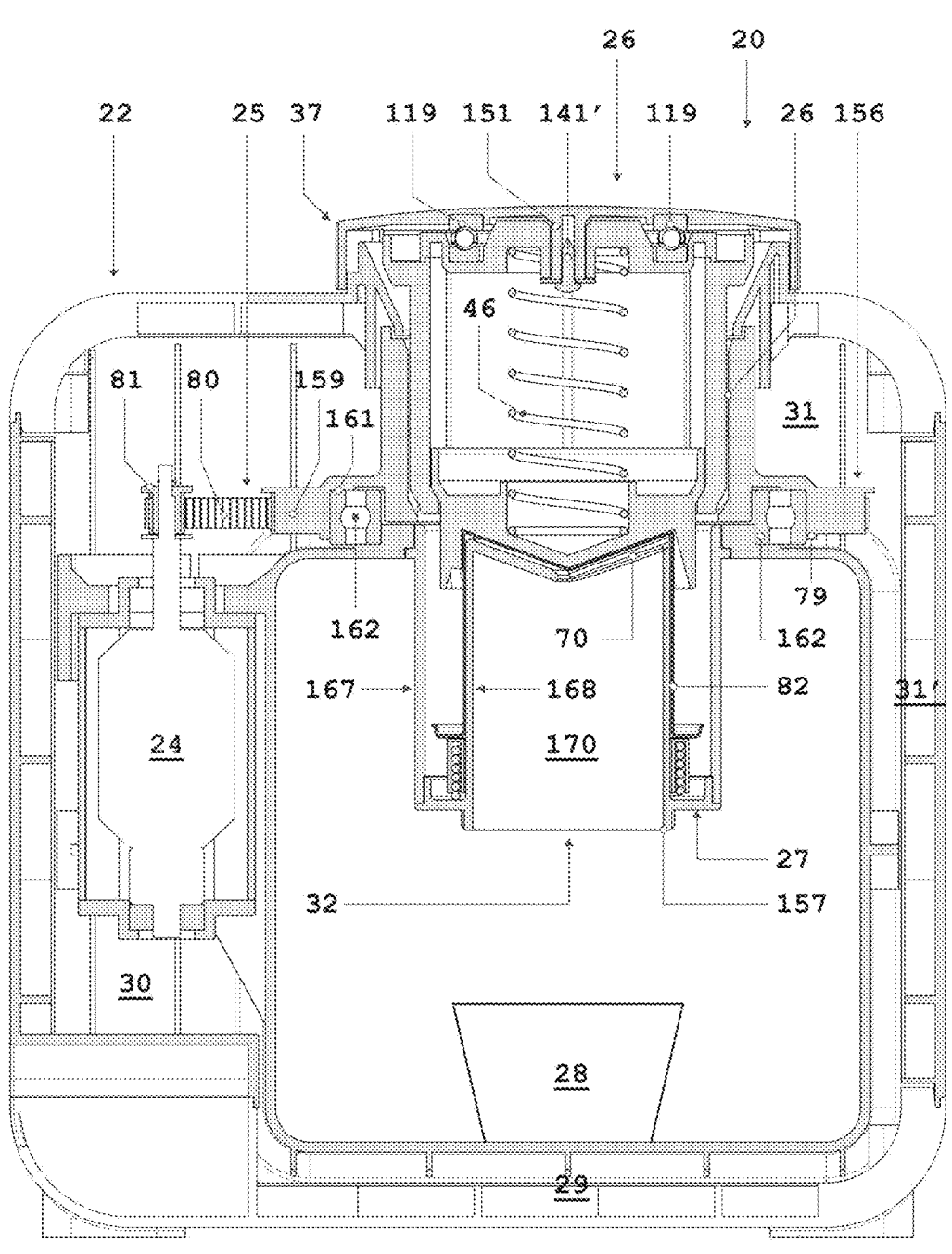
FIG. 12, which shows a side section view of a third embodiment of the machine of FIG. 1.
Figure 13:
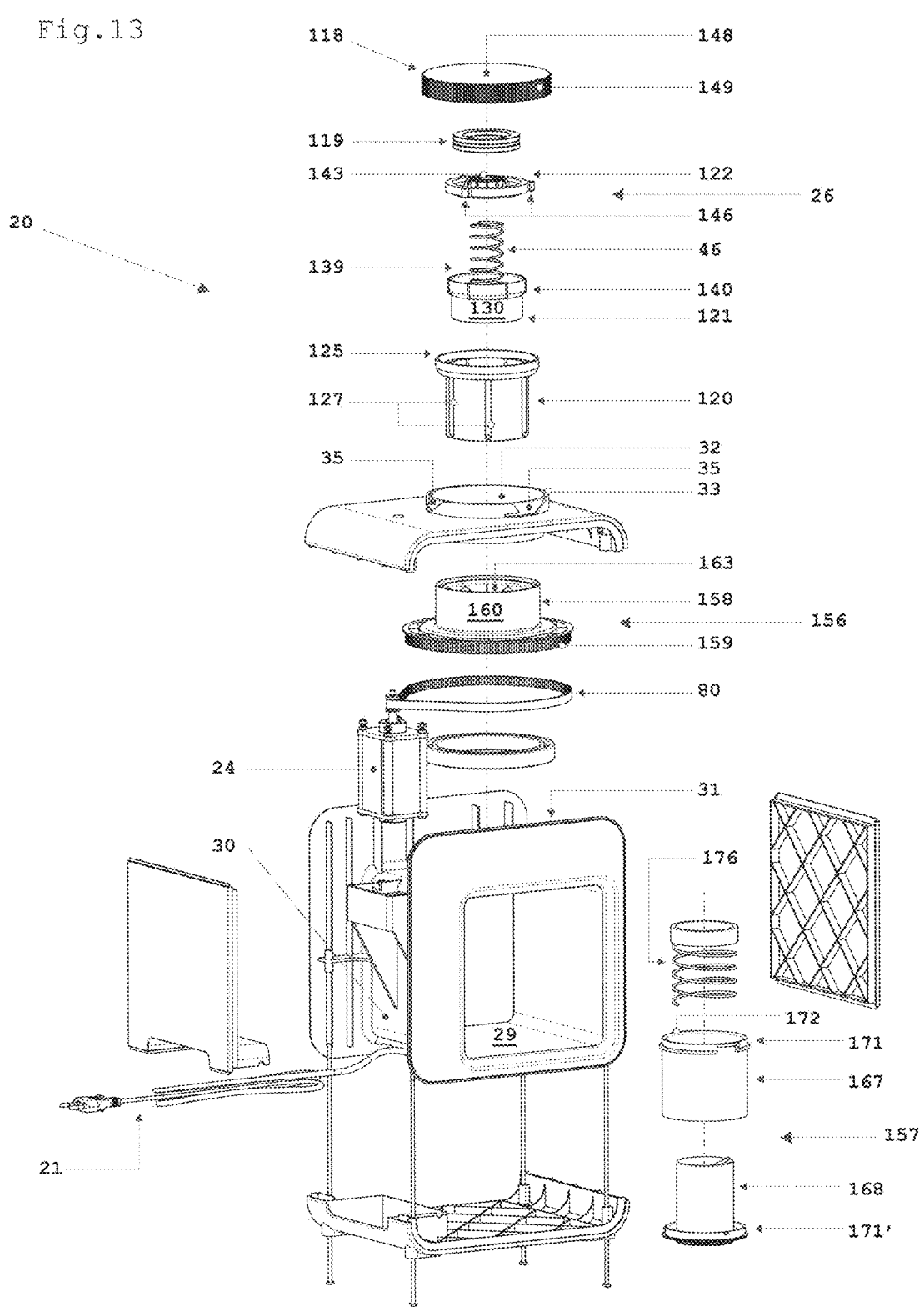
FIG. 13, which shows an exploded perspective view of the elements of the machine of FIG. 12.

The FIGS. 11a and 11b show a second possible non-limiting example of a storage container 82, respectively with an exploded perspective view in the storage position, and with a perspective view in the extraction position of the same food substance, which container 82 may be used in particular with the second embodiment of the machine 20.

Such a container 82 is made of rigid or semi-rigid material suitable for containing frozen food and preferably of the recyclable type, and is constituted by said hollow cylindrical body 83, which has a first transversal end portion 112 opened and shaped with an externally flat edge 113 extended laterally by slightly bending, and a second closed transversal end portion 111 provided with at least one external rib 115.

This external rib 115 is shaped with at least one rectilinear segment, such as for example three rectilinear segments 116 equal to each other arranged in a radial pattern.

As already described above, such a container 82, in particular in this embodiment example, is shaped and sized for being able to be housed inside the external hollow cylindrical body 108 and for coupling its at least rib 115 with the at least groove 104 of the hollow body 97, for rotating in an integral way only with this latter.

At the state of preservation of the frozen substance 87, this container 82 is closed by means of a rigid flat cylindrical cap 92 applied by interlocking to such a shaped edge 113, which being suitably sized, or with a cylindrical plastic film 93, as for example a film, heat-sealed outside to the shaped edge 113.

The container 82, thus constituted, may be opened easily by any user, with only the use of the hands, for being then inserted inside the machine 20, as above explained.

Now it is described the machine 20 in the third embodiment thereof, shown particularly in FIGS. 12-21d.

The closing and pushing unit 26 of the frozen substance to be crushed (see in particular FIGS. 14 and 15) comprises at least one central moving means 117 and at least one upper closing element 118, joined to each other in a removable manner and independent in rotation with respect to each other, with the interposition of at least one balls circular sliding element 119, as for example a bearing.

Such a central moving means 117 is constituted by a first shaped external hollow cylindrical body 120, in which a second shaped internal hollow cylindrical body 121 and a vertical pushing and contrasting means 46, as for example a contrast spring, are inserted concentrically, and which first shaped body 120 is provided on its upper part with a third shaped circular closing body 122.

Said first shaped cylindrical hollow body 120 is shaped with a cylindrical portion 123 with a central concentric through hole 124, with the upper edge 125 protruding outwards, and with the lower edge 126 protruding internally in said hole 124.

Such a cylindrical portion 123 is provided on its external surface with at least one externally projecting rectilinear rib 127 with vertical extension, whereas its internal surface is provided with at least one rectilinear groove 128 with vertical extension.

Such an upper edge 125 is provided with a plurality of vertical threaded holes 129.

Figure 16:
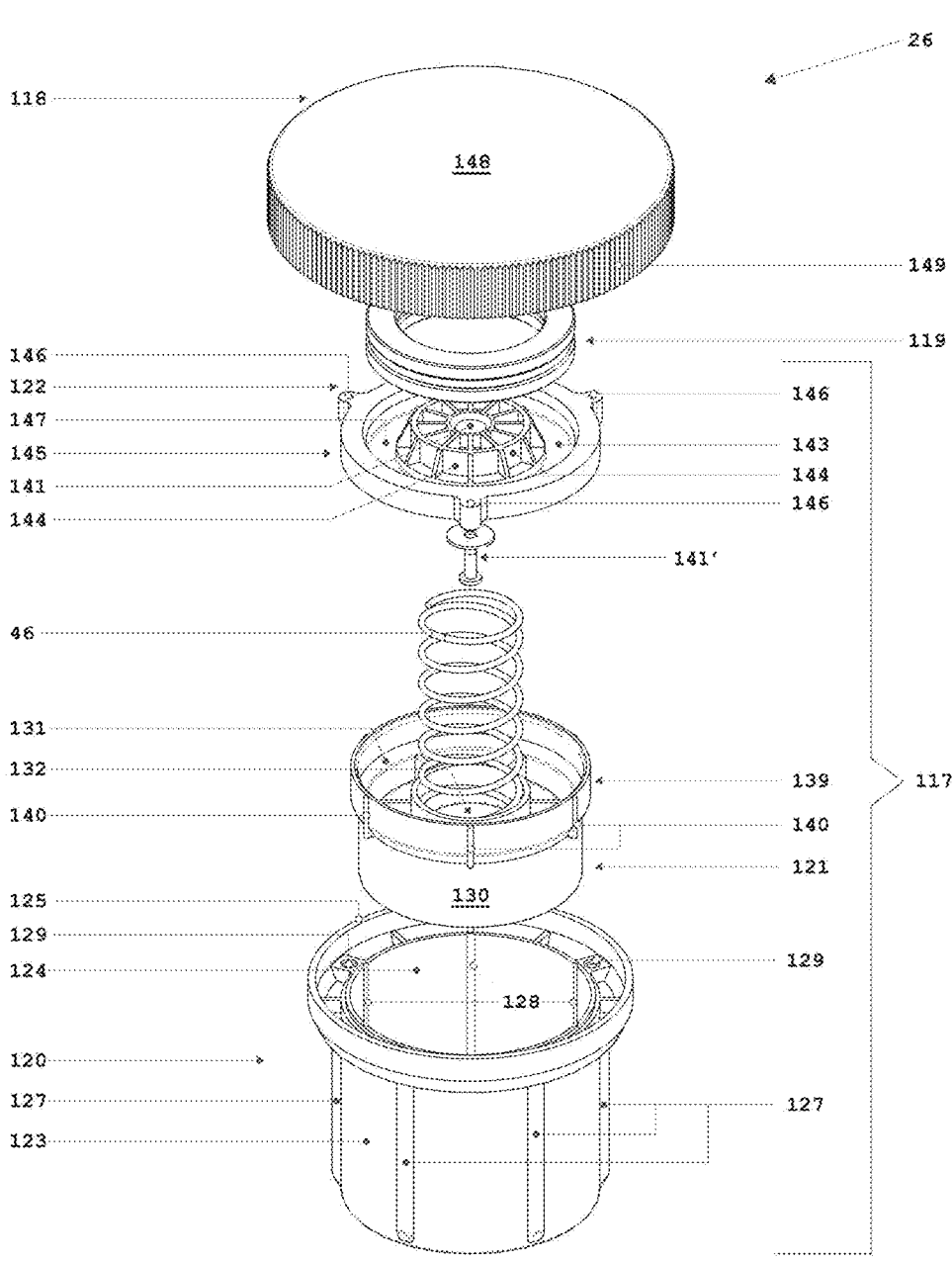
FIG. 16, which shows an exploded perspective view of the first group of elements of FIGS. 14 and 15.
Figure 16A:
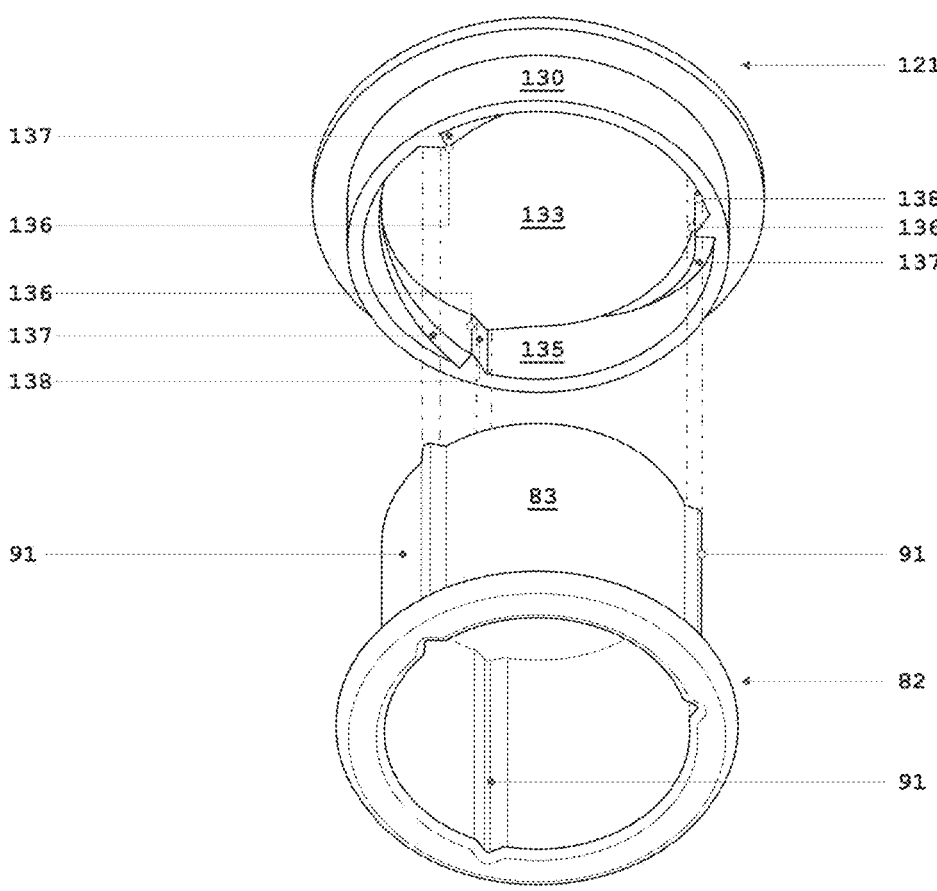
FIG. 16a, which shows a perspective view from below of a component element of the group of component elements shown in FIGS. 14 and 15, with the example of container shown in FIGS. 7a and 7b.
Figure 17:
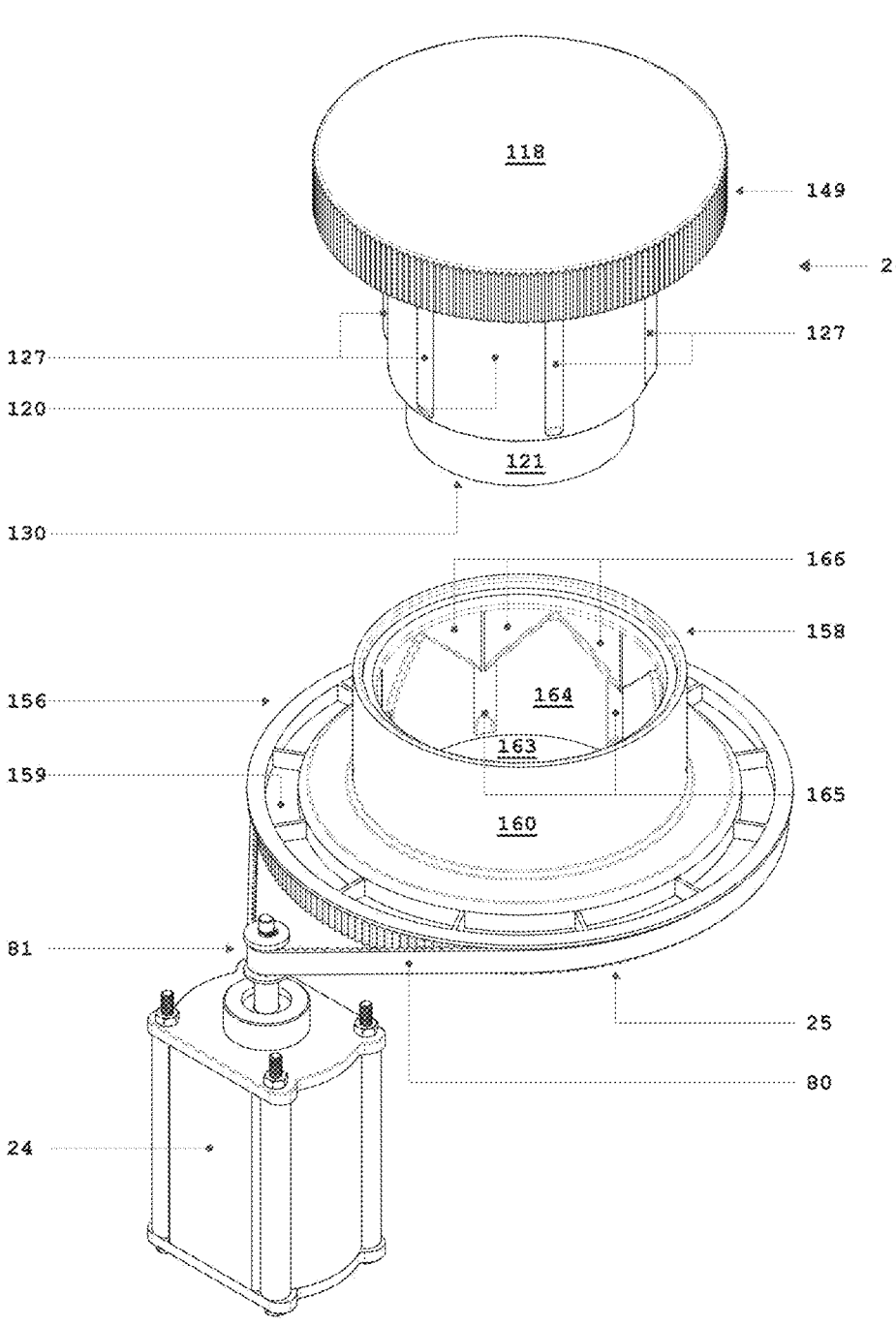
FIG. 17, which shows a perspective top view of the first group of component elements of FIG. 14 and of further groups of internal component elements of the semi-automatic crushing machine in the third embodiment thereof, according to the invention.

Said second shaped internal hollow cylindrical body 121 is shaped with a cylindrical portion 130 provided with a first central vertical upper blind hole 131 ending at the bottom thereof with a second vertical blind hole 132, having a diameter smaller than the first hole 131, and provided with a third lower central vertical blind hole 133 ending with an upper surface 134, preferably flat or conical downwards, on whose internal circular wall 135 there is at least one step 136, which follows its cylindrical profile, with a surface having an inclined curved lower front profile 137, which tapers upwards, and a rear vertical profile 138 (See FIGS. 16 and 16a).

Said cylindrical portion 130 is also provided with an upper circular edge 139 protruded outwards, in turn provided with at least one vertical rectilinear rib 140, in number equal to the number of the at least rectilinear groove 128, and sized in such a way to be able to couple with and to slide free therein internally without angular play.

Said third shaped circular body 122 is shaped with a cylindrical body 122 provided centrally with a vertical through hole 141 and below with a circular groove 142 concentric to this latter, whereas at its upper part it is provided with a central raised circular portion 143, which is shaped centrally with a raised frusto-conical portion, through which the said central hole 141 passes, and peripherally with a plurality of recesses 144 identical to each other and arranged radially, such a cylindrical body 122 also having in proximity to its outer edge 145 a plurality of vertical through holes 146, preferably threaded, in number and arranged in such a way to be able to couple with said through holes 129, and to be joined to them by means of fastening means, as for example screws, thus creating a single body.

Furthermore, this cylindrical body 122 is provided, between the outer edge 145 and such an upper circular portion 143, with a circular groove 147, concentric to the said through hole 141.

Said lower circular groove 142 and said upper blind hole 132 are sized with the same diameter, and are adapted to house the upper and lower end portions of the vertical pushing and contrasting means 46.

Such a central moving means 117 thus assembled, that is with the third body 122 fixed upperly to the first body 120, and within which the second body 121 slides vertically, independently with respect to the first two bodies, pushed downwards by the means of pushing and contrasting 46.

Figure 14:
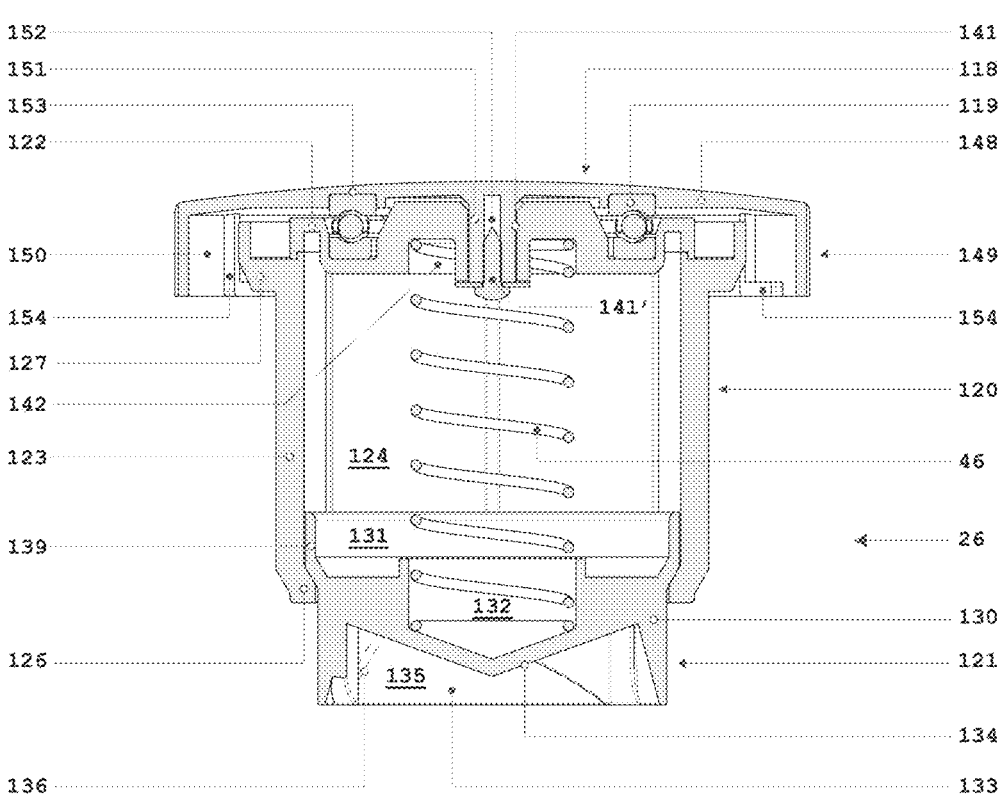
FIG. 14, which shows a side section view of a first group of component elements of FIGS. 12 and 13, joined together.
Figure 15:
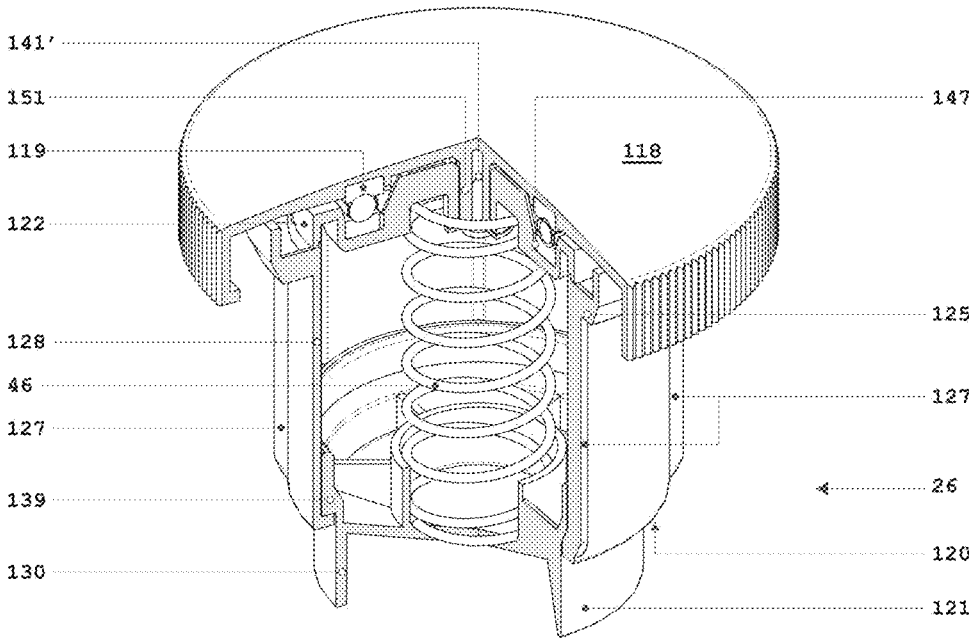
FIG. 15, which shows a perspective cross-section view of the first group of component elements of FIG. 14.

The upper closing element 118 is constituted by a cylindrical body 148, preferably with its circular vertical wall 149 knurled externally, and provided with a lower cylindrical hollow area 150, in which there is provided a cylindrical portion 151 extended downwards and provided with a concentric vertical blind threaded hole 152, and a concentric circular flat groove 153, identical in shape and size to said upper groove 147 of the third hollow body 122 (See FIG. 14).

Furthermore, said circular wall 149 is internally provided with quick fastening means 154, as for example of the Bayonette type (See FIG. 14).

The closing element 118 is positioned above the third body 122, by coupling the respective grooves 153 and 147, creating a hollow area, in which said circular sliding means 119, as for example a bearing, is inserted, and inserting the cylindrical portion 151 within the through hole 141 joining them by means of a screw 151', which being screwed into the threaded hole 152, so that the closing element 118 and the third body 122 be independent in rotation to each other, and the reciprocal sliding in rotation being increased by said bearing 119.

Said crushing and discharging unit 27 (See FIGS. 12, 13, 17, 18, 19, 20) is substantially constituted by a component element 156 for the motion transmission and a crushing means 157.

Such a component element 156 for the motion transmission, in one a first embodiments thereof, is constituted by a first hollow vertical cylindrical body 158, provided concentrically in its lower external part with a second cylindrical body 159, with a diameter greater than the cylindrical body 158, shaped externally as a pulley, preferably provided with a vertical toothing on its entire external perimeter, which leaves free an upper portion 160 of cylindrical body 158. Said second cylindrical body 159 is also concentrically provided with a lower circular groove 161, having a diameter greater than the first cylindrical body 158, and adapted to house at least one circular sliding means 162, as for example a bearing.

Said first hollow cylindrical body 158 has a concentric vertical through hole 163, provided on its internal surface 164 with at least one rectilinear vertical groove 165, equal in number to that of the at least rib 127 of said cylindrical portion 123, such hole 163 and at least groove 165 being sized to house said cylindrical portion 123 by coupling said at least groove 165 with said at least rib 127, in such a way to avoid angular play between the two said elements.

Said internal surface 164, in correspondence of each groove 165, may be provided with an upper recess 166 with a triangular vertical section turned downwards, in such a way to facilitate the coupling between grooves 165 and ribs 127.

Said component element 156 is housed in the upper compartment 31 of the support cabinet 22, in correspondence of the hole 32, and with the bearing 162 housed in a seat 79, provided inside the compartment 31, so that said central moving element 156 may rotate freely with vertical axis with respect to the support cabinet 22 around said hole 32.

Figure 18:
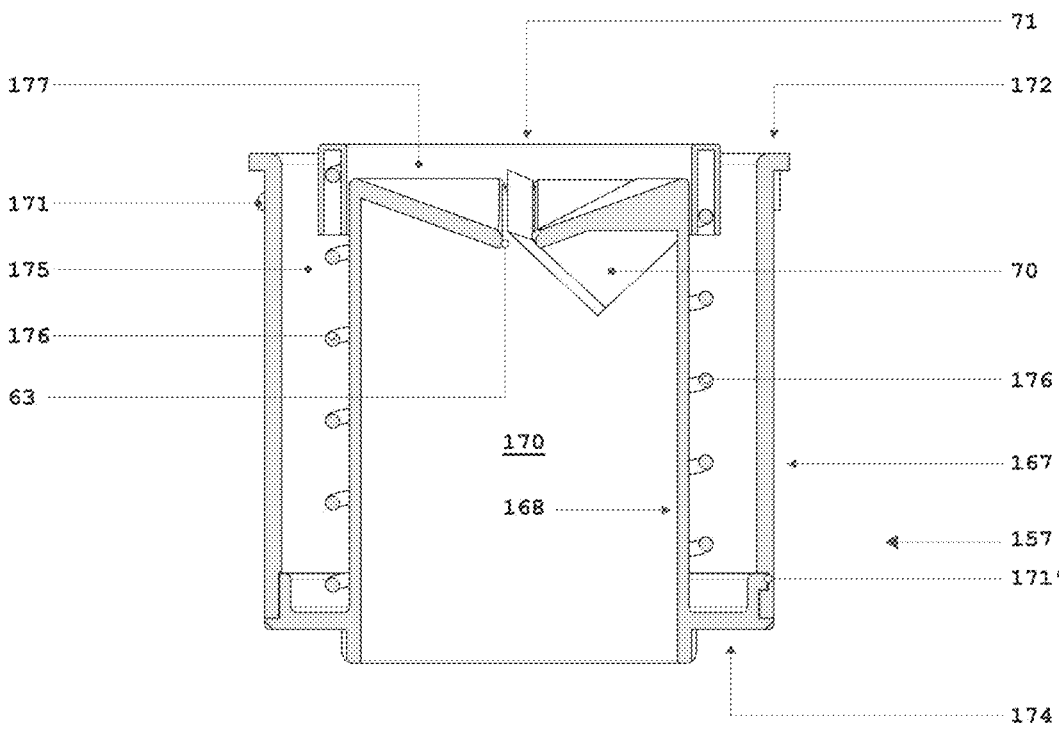
FIG. 18, which shows a side sectioned view of a further group of component elements of FIGS. 12 and 13.
Figure 19:
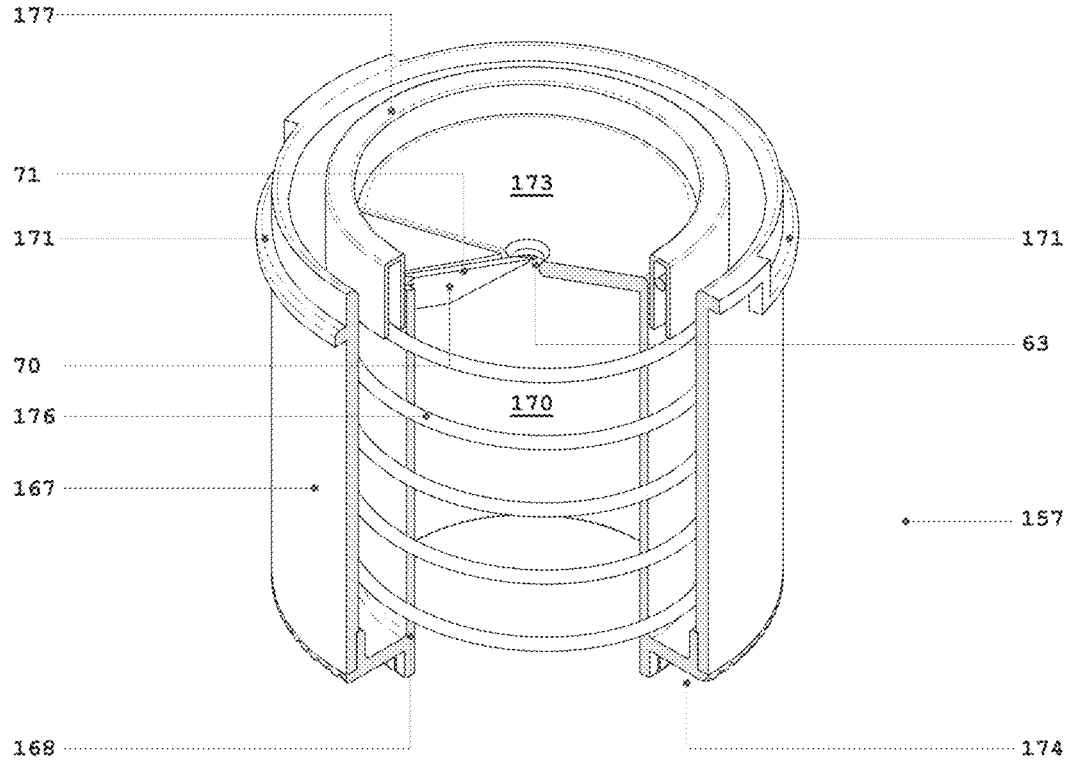
FIG. 19, which shows a perspective cross-section view of the group of component elements of FIG. 18.
Figure 20:
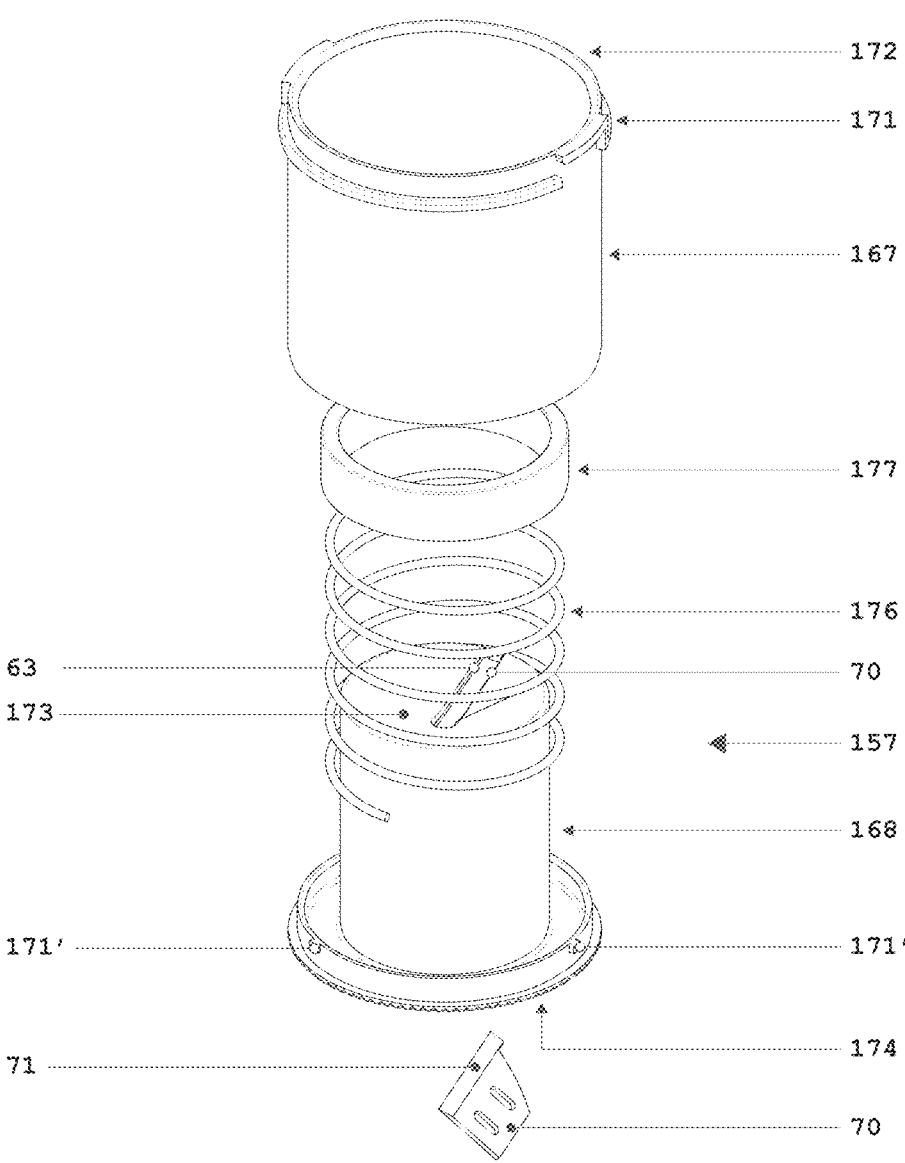
FIG. 20, which shows an exploded perspective top view of the components of the group of elements of FIG. 18.

Said crushing means 157, shown in particular in FIGS. 18, 19, 20, is substantially constituted with two concentric shaped hollow cylindrical bodies 167 and 168 and joined at the bottom thereof in a removable way, by means of quick fastening means 169, as for example of the Bayonette type, of which the first external cylindrical body 167 is provided with a central through hole 170, and with quick fastening means 171, as for example of the Bayonette type, in its upper external part 172, and of which the second internal cylinder 168 has a diameter and height lower than the first external cylinder 167, and is hollow at the bottom thereof, furthermore on its upper surface 173, horizontal or downward conical, it has at least one opening 63, to which at least one blade 70 is fixed, with the cutting part 71 turned upwards and parallel to said surface 173, and which leaves the same opening 63 partially free, said body 168 being provided at the bottom thereof with an enlarged lower edge 174, provided with quick fastening means 171', as for example of the Bayonette type, preferably externally knurled and sized in such a way as to be able to be joined with the first cylindrical body 167, by means of the respective quick fastening means, thus creating a single body 157.

The internal cylindrical body 168 thus becomes a blade holder element.

Said crushing means 157 is sized in such a way to be fixed lowerly to the possible cylinder 34 by coupling the respective quick fastening means 171 and 35.

Said closing and pushing unit 26 is inserted in the hole 32 of the support cabinet 22, by engaging, as above described, with the said moving element 156 and being fixed to the same cabinet 22, by means of the respective quick fastening means 154 and 35.

As previously said, the first electric actuation means 24 and the crushing and discharging unit 27 are joined to each other by motion transmission means 25, which, in a first embodiment thereof, are constituted for example by a toothed belt 80, or a chain or an equivalent element.

Such a toothed belt 80 is arranged and tensioned between an upper pulley 81 with vertical axis of the first electric actuation means 24 and the pulley 158 of the crushing and discharging unit 27, in such a way that, thanks to the movement created by the actuation means 24, when activated, the pulley 158 may rotate thanks to said bearing 162 and consequently also the closing and pushing unit 26.

Such an electric actuation means 24 may be powered and actuated by electric starting means 24', as for example a push-button or a switch, arranged externally to the support cabinet 22 (see FIG. 1-2) and/or arranged near the upper cylindrical extension 33 of the hole 32 (see FIG. 22), so that the closing and pushing unit 26 activates it when it is pressed and engaged with the quick fastening means to the upper cylinder 33 of the same support cabinet 22.

With this third embodiment, with the machine 20 without the closing and pushing unit 26, a storage container 82 containing the frozen food substance 87 to be crushed is inserted in the same machine 20, opened at the bottom thereof above the crushing unit 27, in such a way that the lower surface of the frozen substance 87 leant on the upper surface 173.

Then it proceeds by positioning the closing and pushing unit 26 on the machine 20, so that the pushing and contrasting means 46 is compressed upwards by the cylindrical body 121, pushed in turn upwards by the container 82, and then by locking the closing element 118 on the short cylinder 33 by means of the respective quick fastening means.

Said body 121 acting as a vertical guide element for the container 82.

By starting the actuation means 24, the central moving means 117 rotates by means of the motion transmission means 25, so that the body 122 with its at least step 136 engages with the at least rib 91 of the container 82, that is the surface 137 of the step 136 slides along the at least rib 91 of the container 82, and is then constrained against the rear vertical surface 138, in such a way to be able to rotate the same container 82 on a vertical axis.

Figure 21A:
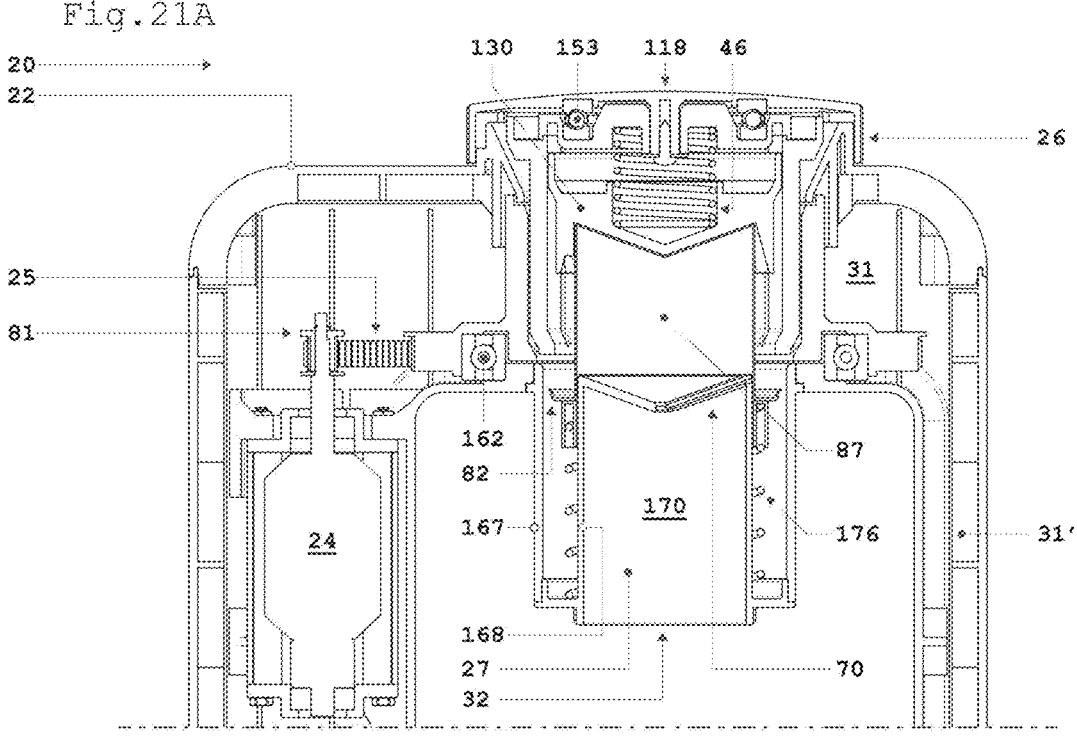
FIG. 21a shows, with a side section view of a group of component elements of the machine of FIG. 12, in a first step of the crushing cycle of the frozen food substance.
Figure 21B:
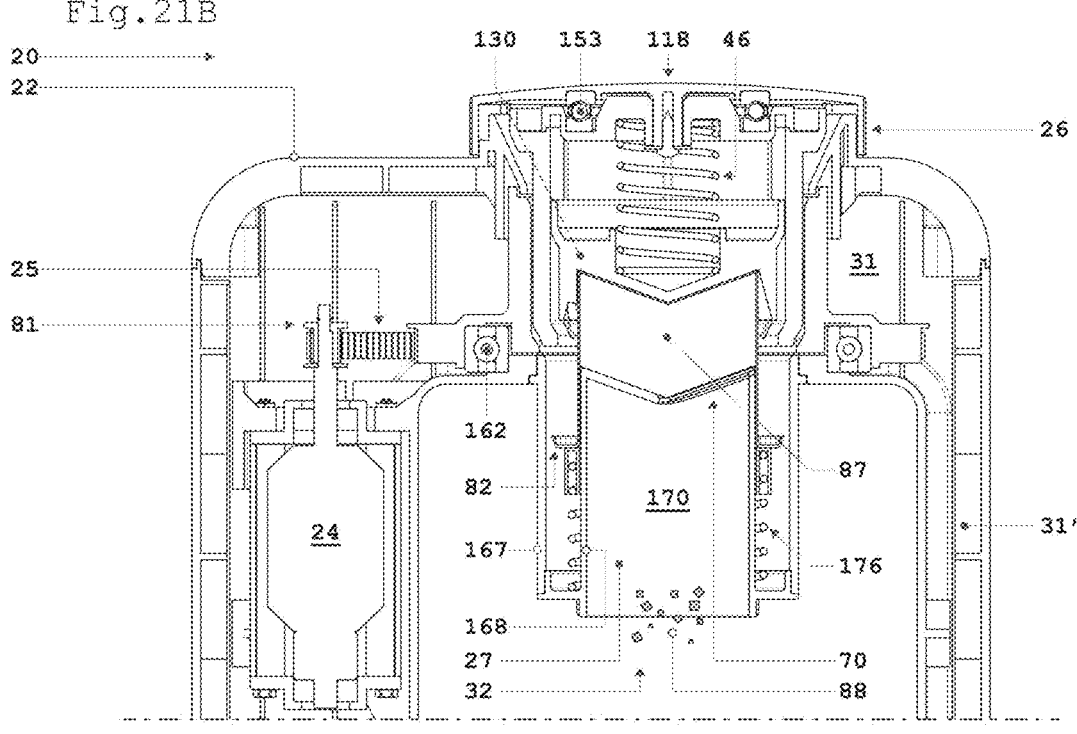
FIG. 21b shows with a side section view of a group of component elements of the machine of FIG. 12, in a second step of the crushing cycle of the frozen food substance.

As shown in FIGS. 21a-21b, the frozen substance 87 contained in the container 82 is pushed on the at least blade 70, that rotating integral with the container 82 is crushed by making this blade 70 penetrate inside, as the body 122 slides downwards together with the container 82, which in particular with its cylindrical wall penetrates into the space including two cylindrical hollow bodies 167 and 168 of the crushing means 157, while such crushed food substance 88 falls through the opening 63 in the collecting container 28 positioned below it, on the base 29 of the cabinet 22.

Figure 21C:
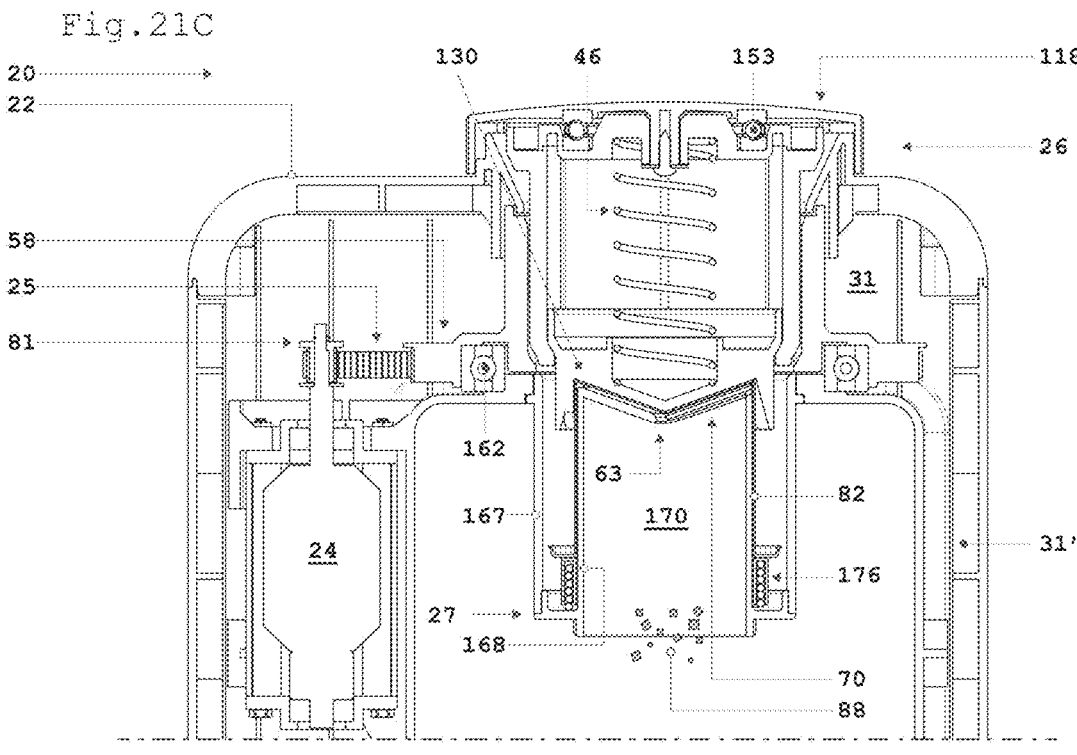
FIG. 21c shows with a side section view of a group of component elements of the machine of FIG. 12, in a third step of the crushing cycle of the frozen food substance.

At the end of the crushing step of the entire frozen food substance 87 contained in the storage container 82, as shown in FIG. 21c, the closing and pushing unit 26 is disassembled, thus being able to replace the empty container 82 to proceed with a subsequent crushing, and possibly washing the internal crushing and discharging components 27, both for its hygiene and in order not to contaminate the taste of the frozen food substances 87 which will be subsequently crushed.

The rotation speed of the crushing and discharging unit 27, set thanks to the control and command electronic circuit board 23, and the number of blades 70, are variable according to the type of frozen food substance 87 to be crushed and the type of crushing desired.

Referring to FIGS. 18, 19, 20, it may be noted that, in the free area 175 comprised between the above said hollow cylindrical bodies 167 and 168, it is possible to insert concentrically an elastic pushing and contrasting means 176, constituted by a contrast spring, of a height approximately equivalent to the one of the two said hollow bodies 167 and 168, around the latter, and locked at the bottom thereof by means of fastening means of the per se known type, furthermore said pushing and contrasting means 176 being provided with an upper cylindrical protection element 177.

Such a pushing and contrasting means 176 is sized in such a way to be compressed by the edge of the container 82 which descends downwards while the food substance 87 contained therein is crushed, to be compressed completely downwards allowing the complete crushing of the food substance 87 contained in the container 82.

Figure 21D:
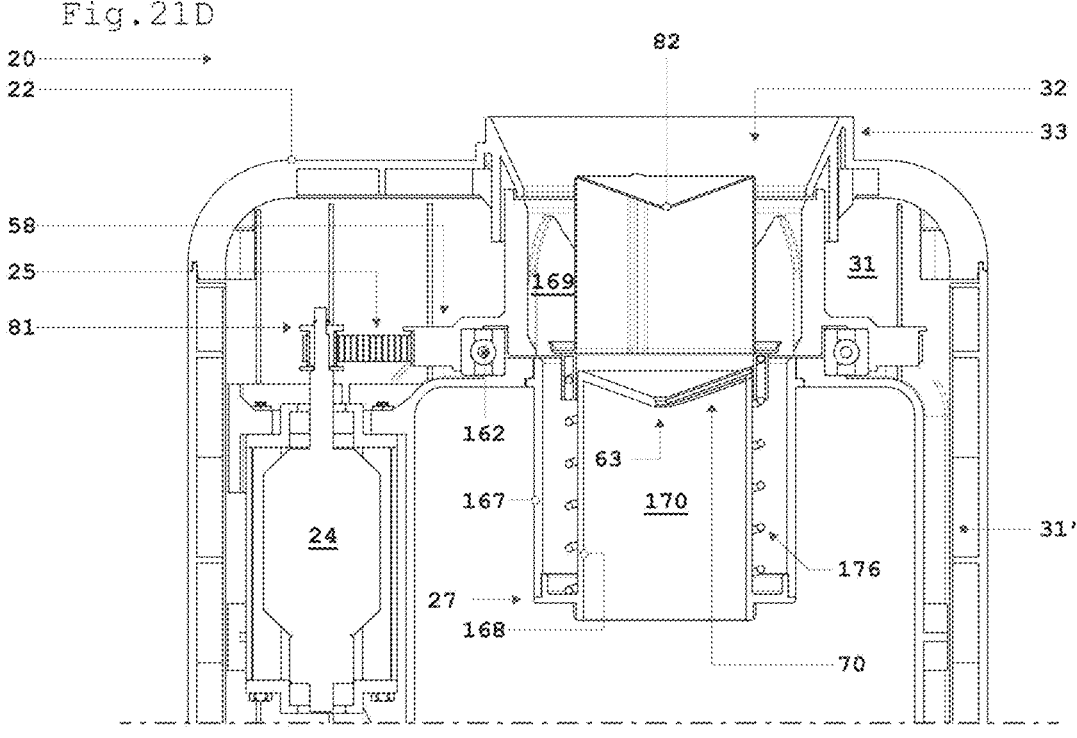
FIG. 21d shows with a side section view of a group of component elements of the machine of FIG. 12, in a fourth step of the crushing cycle of the frozen food substance.

Following, once the crushing step is completed, when the closing and pushing unit 26 is removed, said pushing and contrasting means 176 automatically extends upwards, thus bringing the empty container 82 upwards, facilitating the removal of this latter from the machine 20 (Step represented in FIG. 21d).

Such a pushing and contrasting means 176 has been described as a solution for the third embodiment of this machine 20, but it may be applied with the same purpose both in the first embodiment thereof, by fixing it to the base of the crushing means 55, around the hollow cylindrical body 62, and in the second embodiment thereof, by fixing it to the base of the crushing means 108, around the cylindrical hollow body 109.

Also in the first and second embodiments of the machine 20, such a pushing and contrasting means 176 is sized in such a way to be compressed by the container edge 82 which descends downwards while the food substance 87 contained therein is crushed, in order to be compressed completely downwards allowing the complete crushing of the food substance 87 contained in the container 82.

Figure 23:
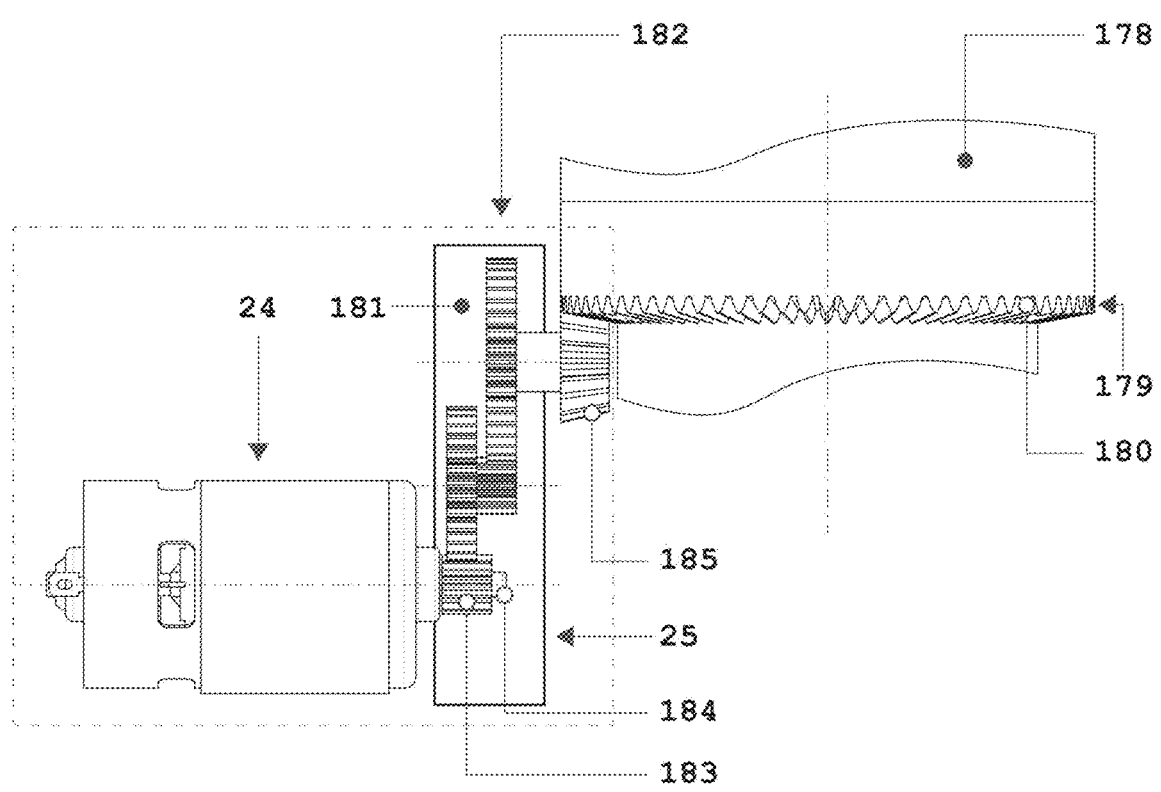
FIG. 23, which shows a side view of a further group of component elements in a second example of embodiment thereof, common to all three of the aforementioned embodiments of the semi-automatic machine, according to the invention.

With particular reference to FIG. 23, it may be noted a second example of an external cylindrical body 178, able to be applied in alternative to the external cylindrical bodies 58, 98 and 159, pulley-shaped, of the respective component elements 54, 94 and 156 for the motion transmission in the respective first, second and third embodiments of the machine 20, coupled with a second example of motion transmission means 25, which are in turn coupled with an electric actuation means 24.

Said external cylindrical body 178 has a diameter greater than the respective cylindrical body 57, 96 and 158 (in the example of FIG. 23 not shown) to which it is coupled and is provided along the entire lower edge 179 thereof with a radial toothing 180, preferably with the horizontal or internally inclined downwards teeth.

Said motion transmission means 25, in this second example, are constituted by at least one gear reduction means 181, consisting for example of a plurality of cogged wheels, with different diameters and engaged to each other, and supported by a fixed box-like structure 182 inside the support cabinet 22.

In particular, a first cogged wheel 183 is arranged at the end portion of the rotating pin 184 with horizontal rotation axis of the electric motor 24, and is engaged with further cogged wheels with horizontal rotation axis, of which the last cogged wheel 185 with horizontal rotation axis is engaged with said toothing 180 of cylindrical body 178.

Such a second example of rotation motion transmission must be considered an alternative to the first example, allowing the same steps of the crushing cycle previously described. Such a semi-automatic machine 20 for crushing frozen food substances thus made in one of the embodiments thereof, therefore allows to eliminate the drawbacks described above relating to the prior art, simply by loading a storage container 82 containing a frozen food substance 87 inside of the same machine 20, by interposing it between the closing and pushing unit 26 and the crushing unit 27, and thanks to the actuation means 24 and the transmission means 25, by rotating the blade holder element of the said crushing unit 27 and by keeping the same container 82 stationary in rotation, or by rotating the container 82 and keeping the blade holder of said crushing unit 27 stationary in rotation, and at the same time by pushing said container 82 downwards thanks to said closing and pushing unit 26, it is obtained the desired crushing of said food substance 87 by means of the blade 70 and by discharging at the same time the same crushed substance 88 through the hole 63 in an automatic, hygienic and safely, thus being able to collect it in a collecting container 28 placed below said opening 63.

Subsequently, it is possible to disassemble from the support cabinet 22 only the closing and pushing unit 26 for the removal and possible replacement of the container 82 and/or its cleaning, or also to disassemble the crushing unit 27 for its cleaning.

The invention claimed is:

1. A semi-automatic machine for crushing and then for collecting outside frozen food substances contained in an external storage container, the semi-automatic machine being electrical and comprising:

a support cabinet adapted to contain and to support various component elements of the semi-automatic machine, the various component elements comprising:

at least a control and command electronic circuit board that includes at least a microprocessor, at least a first electrical actuation means, at least a motion transmission means, at least a closing and pushing unit, and at least a crushing and discharging unit, said motion transmission means associated and cooperating with said first electrical actuation means and said closing and pushing unit or said crushing and discharging unit, wherein said support cabinet comprises at least a first upper compartment provided with a vertical through hole in which said closing and pushing unit is configured to be inserted in a removable way and to which said crushing and discharging unit is configured to be fixed in a removable manner, wherein the storage container containing the frozen food substance is configured to be placed into contact between said closing and pushing unit and said crushing and discharging unit, with an opened end portion turned toward the crushing and discharging unit in a non-rotatable way with respect to said closing and pushing unit, wherein said closing and pushing unit comprises:

at least a closing element adapted to engage with said support cabinet for closing the upper part of said vertical through hole, a first vertical hollow cylindrical body, and a vertical guide element adapted to guide, vertically, said storage container by sliding within said first hollow cylindrical body in an independent manner with respect to the first hollow cylindrical body, and a pushing and contrasting means comprising a contrast spring, the pushing and contrasting means configured to push, downwards, said guide element, wherein said crushing and discharging unit comprises at least a first vertical cylindrical body provided on its upper surface with at least an upper opening, to which at least a blade is fixed, with a cutting part thereof turned in an upward direction, thereby leaving at least partially free the same upper opening, wherein said actuation means are adapted to transmit a rotational movement with a vertical rotation axis, by said motion transmission means, to the vertical guide element or to the first vertical cylindrical body, in such a way that the frozen food substance is crushed by the blade using the rotational movement and, at the same time, using the pushing and contrasting means, said container is moved downward toward said first vertical cylindrical body with the consequent penetration of the first vertical cylindrical body into the same container, such that the crushed food substance is discharged outside the machine through the upper opening for collection, wherein said closing and pushing unit is configured to be removable from the support cabinet and said crushing and discharging unit is configured to be removable from said support cabinet.

2. The semi-automatic machine according to claim 1, wherein said first electrical actuation means comprises an electric motor powered in a selective manner at low voltage by an inverter.

3. The semi-automatic machine according to claim 1, wherein:

said closing element of said closing and pushing unit includes a quick fastening means comprising a bayonet fastener that is configured to be removable quickly, and is arranged on the upper part of said vertical through hole, in an upper extension thereof, and the crushing and discharging unit includes a quick fastening means comprising a bayonet fastener that is configured to be removable quickly, and is arranged in the lower part of said vertical through hole, in a lower extension thereof.

4. The semi-automatic machine according to claim 3, wherein:

a second elastic pushing and contrasting means comprises a contrast spring inserted around said vertical cylindrical body and fixed to a base thereof, and the contrast spring is sized to be compressed by the edge of the container, allowing the complete crushing of said food substance, and configured to extend automatically upward when the closing and pushing unit is removed, so as to bring the empty container upward and facilitate removal of the empty container from the machine.

5. The semi-automatic machine according to claim 1, wherein:

said first vertical hollow cylindrical body comprises an internal surface with at least one groove which is at least partially vertical, said vertical guide element comprises an external surface with at least one external vertical rib, and a number and size of said at least one external vertical rib corresponds to a number and size of the at least one said groove, so as to facilitate coupling with and sliding freely into said groove without angular backlash.

* * * * *